United States Patent [19]
Muraji

[11] Patent Number: 5,841,273
[45] Date of Patent: Nov. 24, 1998

[54] ELECTRONIC MAGNETIC POSITION SENSOR USING A MAGNETIC PATH LINKING AN ENERGIZING COIL AND TWO DETECTORS

[75] Inventor: Tetsuo Muraji, Odawara, Japan

[73] Assignee: Mikuni Corporation, Tokyo, Japan

[21] Appl. No.: 545,035

[22] Filed: Oct. 18, 1995

[30] Foreign Application Priority Data

Feb. 22, 1995 [JP] Japan ................................. 7-034072

[51] Int. Cl.$^6$ .............................. G01B 7/14; G01B 7/30; G01D 5/20
[52] U.S. Cl. .............................. 324/207.17; 324/207.12; 324/207.24; 324/207.25
[58] Field of Search ........................ 324/207.17, 207.18, 324/207.19, 207.22, 207.24, 207.25, 207.26, 207.12, 225; 340/870.31, 870.35, 870.36

[56] References Cited

U.S. PATENT DOCUMENTS 3,178,696  4/1965  Claflin, Jr. .

FOREIGN PATENT DOCUMENTS

| | | |
|---|---|---|
| 0 161 760 A1 | 3/1985 | European Pat. Off. . |
| 0 478 143 A1 | 8/1991 | European Pat. Off. . |
| 0 512 282 A1 | 4/1992 | European Pat. Off. . |
| WO 93/22622 | 11/1993 | European Pat. Off. . |
| 2 688 586-A1 | 3/1992 | France . |
| 36 02 107 A1 | 1/1986 | Germany . |
| 38 03 293 A1 | 4/1988 | Germany . |

*Primary Examiner*—Walter E. Snow
*Attorney, Agent, or Firm*—Hill & Simpson

[57] ABSTRACT

A magnetic sensor comprising at least one energizing coil (5), at least two magnetism detection elements (6a, 6b), a magnetic path forming means interlinking with the energizing coil and making a magnetic flux having passed through the magnetism detection elements (6a, 6b) pass therethrough and having a magnetic reluctance corresponding to a variable position of a movable member to be detected, and a position signal generating means for generating a position signal on the basis of output signals from said magnetism detection elements. This magnetic sensor preferably includes determining means (15) for producing an enable signal when an instantaneous signal of an output signal (c) generated from at least one of the magnetism detection elements or an instantaneous value of an energizing current flowing in the energizing coil (5) is higher than a specified level.

19 Claims, 34 Drawing Sheets

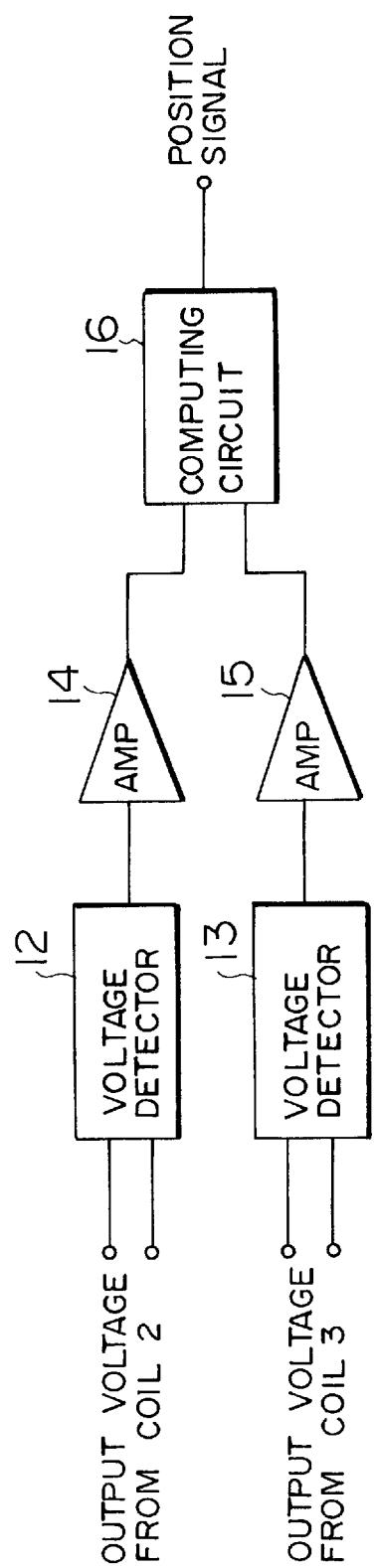

FIG. 23
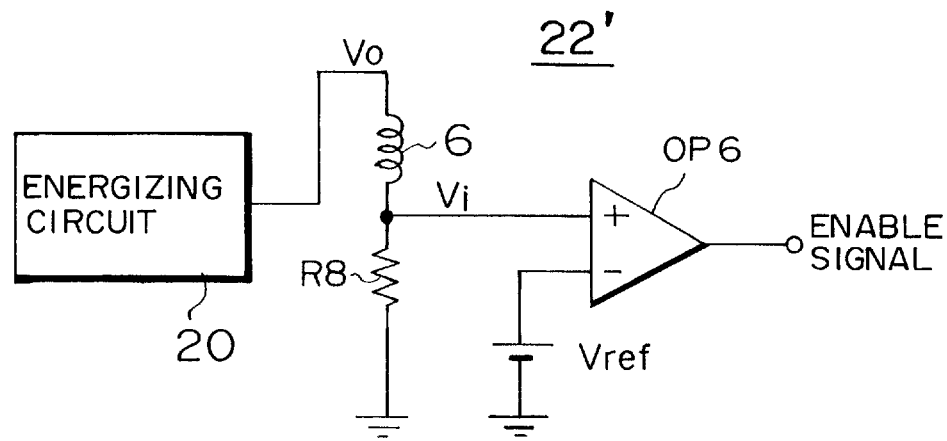
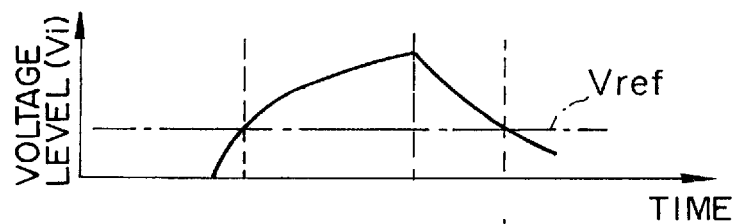
FIG. 24(A)
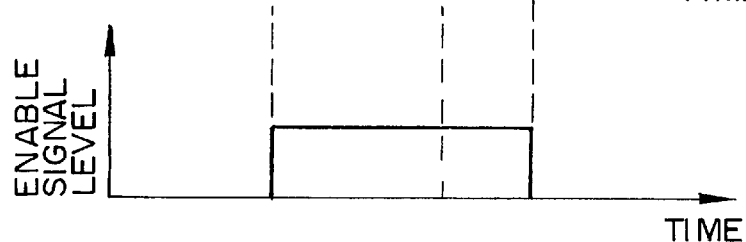
FIG. 24(B)
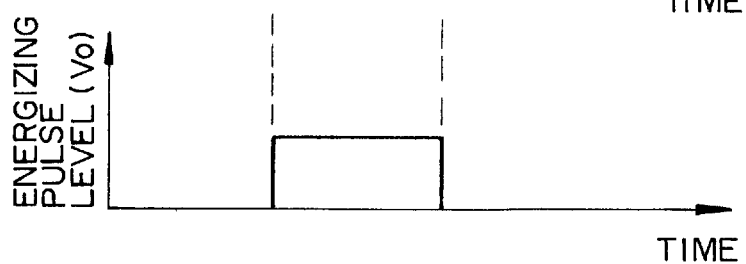
FIG. 24(C)

FIG. 25
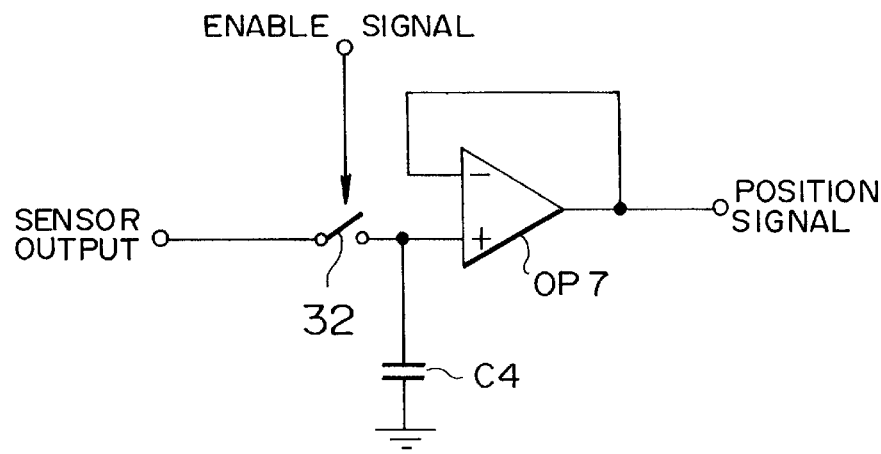
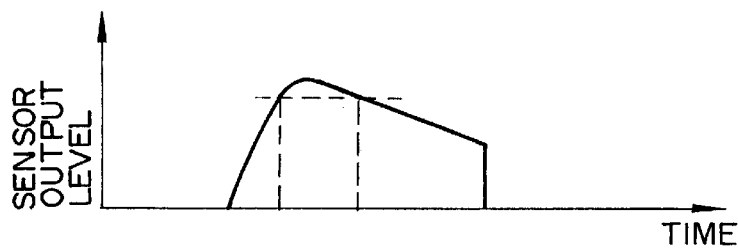
FIG. 26(A)
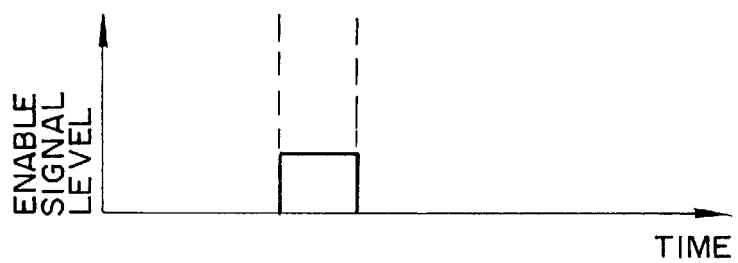
FIG. 26(B)
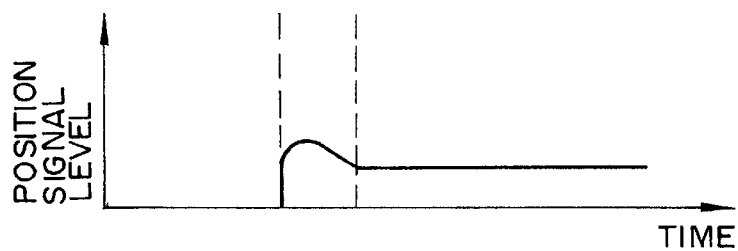
FIG. 26(C)

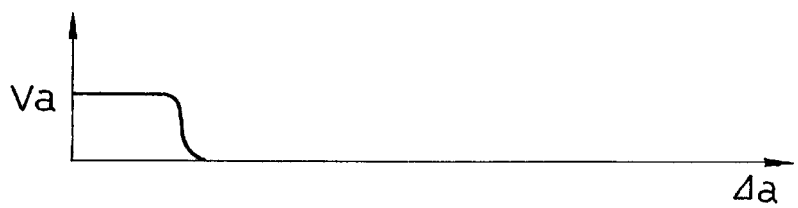
FIG. 44(A) Va
FIG. 44(B) Vb
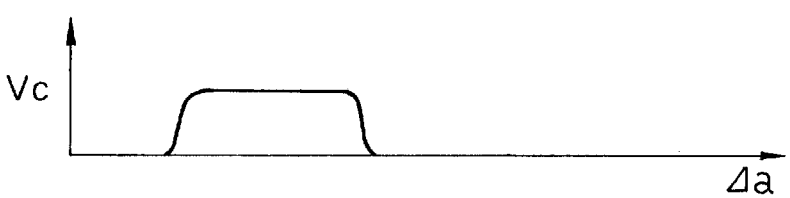
FIG. 44(C) Vc
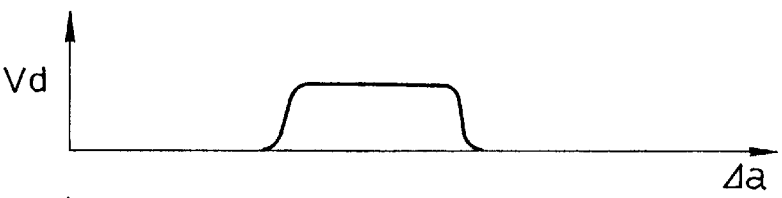
FIG. 44(D) Vd
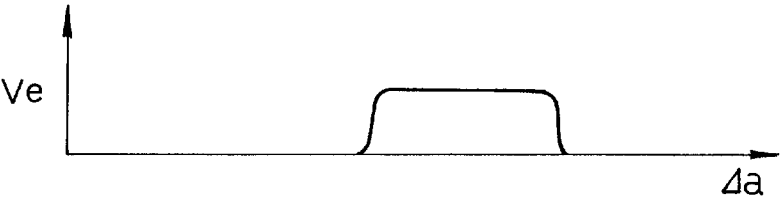
FIG. 44(E) Ve
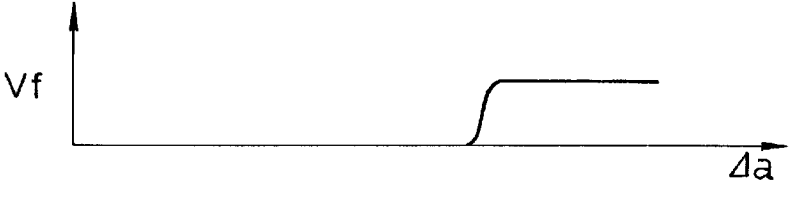
FIG. 44(F) Vf

ELECTRONIC MAGNETIC POSITION SENSOR USING A MAGNETIC PATH LINKING AN ENERGIZING COIL AND TWO DETECTORS

BACKGROUND OF THE INVENTION

1. Field of the Invention

The present invention relates to a magnetic position sensor capable of detecting a position of a movable member which either translates or rotates.

2. Description of the Related Art

As such magnetic position sensor which has been mentioned above, there has been known a throttle position sensor which magnetically detects an opening degree of a throttle value in an internal combustion engine. The examples are, for instance, those disclosed in Japanese Patent Kokoku No.55-13286 and in Japanese Patent Kokoku No.55-9818. In these magnetic position sensors, a movable magnetic core and a fixed core are connected to each other at three opposing sections and form two closed magnetic circuits. An area of each opposing section changes according to displacement of the movable magnetic core, change of inductance in each coil due to magnetic reluctance in each closed magnetic path is detected, and a position signal for the movable magnetic core is detected.

However, the two closed circuits each formed by a movable magnetic core and a fixed magnetic core are have properties are dependent on the gap length as well as the largeness of the area of the opposing section. In order to maintain a gap length between the two magnetic cores at a constant value when the movable magnetic core displaces against the fixed magnetic core, it is required to manufacture parallel surfaces of the two magnetic cores facing to each other at a high precision, which makes the production cost advantageously higher.

Also there has been a magnetic position sensor making use of a Hall element, such that disclosed in Japanese Patent Kokai No.5-26610.

The sensors as mentioned above has a construction in which a pair of permanent magnets are located at opposing positions on a rotating surface of a throttle shaft which rotates in association with a throttle valve so that the pair will rotate together with the throttle shaft, and furthermore one piece of Hall element is located on an axial line of the throttle shaft between the pair of permanent magnets.

With this configuration, the pair of permanent magnets form a magnetic circuit with a rotating shaft of the throttle shaft therebetween. A direction of a magnetic field in the formed magnetic circuit varies in accordance with a rotational angle of the throttle shaft. For this reason, an opening degree of the throttle can be detected by detecting a change in strength of a magnetic flux passing through the Hall element provided between the pair of permanent magnets.

Also a pair of arcuated permanent magnetics are provided along an arc centering on a rotating axis of the shaft, one piece of Hall element is located at a position away in the axial direction from these circular permanent magnets, and then the idle running state can be detected by detecting a direction of magnetic field of a magnetic circuit formed by the pair of arcuated permanent magnets.

SUMMARY OF THE INVENTION

A primary object of the present invention is to provide a low cost magnetic position sensor which has a simple configuration which does not require precision machining and can detect a displacement due to rotational movement or linear movement of a movable member.

Another object of the present invention is to provide a magnetic position sensor which is little affected by change in the ambient temperature.

Still another object of the present invention is to provide a magnetic position sensor having high durability.

A further object of the present invention is to provide a magnetic position sensor which can suppress influences because of external noises to the minimum level.

A magnetic position sensor according to the present invention comprises at least one energizing coil, at least two magnetism detecting elements, a magnetic path forming means interlinking with said energizing coil, transmitting a magnetic flux passing through said magnetism detecting element, and having a magnetic reluctance corresponding to a current position of a movable member to be detected, a energizing means for energizing said energizing coil with an AD current, and a position signal generating means for generating a position signal indicating a current position of said movable member to be detected according to each output signal from said magnetism detecting element.

A magnetic position sensor according to the present invention comprises at least one energizing coil; at least two magnetism detecting elements; a magnetic path forming means interlinking with said energizing coil, transmitting a magnetic flux passing through said magnetism detecting element, and having a magnetic reluctance corresponding to a current position of a movable member the position of which is to be detected, an energizing means for energizing said energizing coil with an AC current; and position signal generating means for generating a position signal indicating a current position of said movable member in response to the respective output signals from said magnetism detecting elements.

A magnetic position sensor according to the present invention comprises at least one energizing coil; at least two magnetism detecting elements; a magnetic path forming means interlinking with said energizing coil, transmitting a magnetic flux passing through said magnetism detecting element, and having a magnetic reluctance corresponding to a current position of a movable member the position of which is to be detected, an energizing means for energizing said energizing coil with an AC current; and position signal generating means for generating a position signal indicating a current position of said movable member in response to the respective output signals from said magnetism detecting elements; and furthermore determining means for generating an enable signal when a instantaneous value of an addition of the output signals from said magnetism detecting elements is not less than a predetermined level. Herein the technical term of "energization with AC current" covers the energization with a pulse current, and accordingly the energization by a power including an AC component.

BRIEF DESCRIPTION OF THE DRAWING

FIGS. 1(a) to 1(c) are views each illustrating a first embodiment of a magnetic position sensor according to the present invention, wherein FIG. 1(a) is a plan view of the sensor and FIG. 1(b) is a cross-sectional view of the sensor taken along the line IB—IB in FIG. 1(a), and FIG. 1(c) is a cross-sectional view of the same taken along the line IC—IC in FIG. 1(a).

FIG. 2 shows a position detecting circuit in the magnetic position sensor according to the present invention.

FIGS. 3(a) to 3(c) are views illustrating a second embodiment of the magnetic position sensor according to the present invention, wherein FIG. 3(a) is a plan view of the sensor, FIG. 3(b) is a cross-sectional view of the sensor taken along the line IIIB—IIIB in FIG. 3(a), and FIG. 3(c) is a cross-sectional view of the same taken along the line IC—IC in FIG. 3(a).

FIGS. 4(a) and 4(b) are views illustrating a third embodiment of the magnetic position sensor according to the present invention, wherein FIG. 4(a) is a front view of the sensor, and FIG. 4(b) is a cross-sectional view of the sensor taken along the line IVB—IVB in FIG. 4(a).

FIGS. 5(a) and 5(b) are views illustrating a fourth embodiment of the magnetic sensor according to the present invention, wherein FIG. 5(b) is a cross-sectional view of the sensor taken along the line VB—VB in FIG. 5(a).

FIGS. 6(a) and 6(b) are views illustrating a fifth embodiment of the magnetic position sensor according to the present invention, wherein FIG. 6(a) is a sketch of the sensor, while FIG. 6(b) is a section viewed along the arrow VIB in FIG. 6(a).

FIG. 23 is an electric circuit diagram illustrating an other embodiment of the determination circuit shown in FIG. 11.

FIGS. 24(A) and 24(C) are wave form charts respectively illustrating signal wave forms in a major section of the circuit shown in FIG. 23.

FIG. 25 is an electric circuit diagram illustrating one embodiment of a position signal generating circuit for obtaining a position signal for a sensor in response to an enable signal obtained in the circuit of FIG. 11.

FIGS. 26(A) to 26(C) are wave form charts respectively illustrating signal wave forms in a major section of the circuit of FIG. 15.

FIGS. 44(A) to 44(F) are graphs respectively showing output characteristics of the sensor shown in FIG. 43.

DETAILED DESCRIPTION OF THE PREFERRED EMBODIMENTS

Description is made hereinafter for embodiments of the magnetic position sensor according to the present invention with reference to the accompanying drawings. FIG. 1 shows an embodiment of a magnetic position sensor which detects an angular position of a rotary movable member.

Figure 1A:
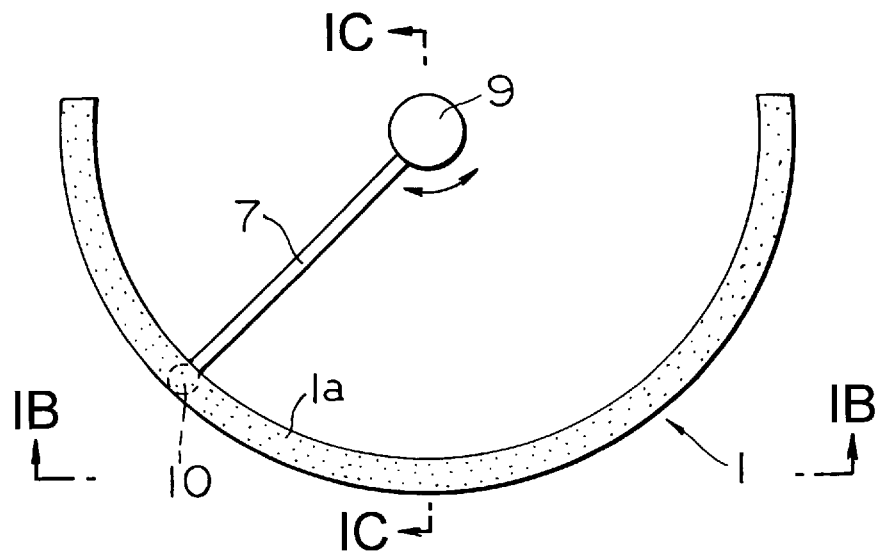
Figure 1B:
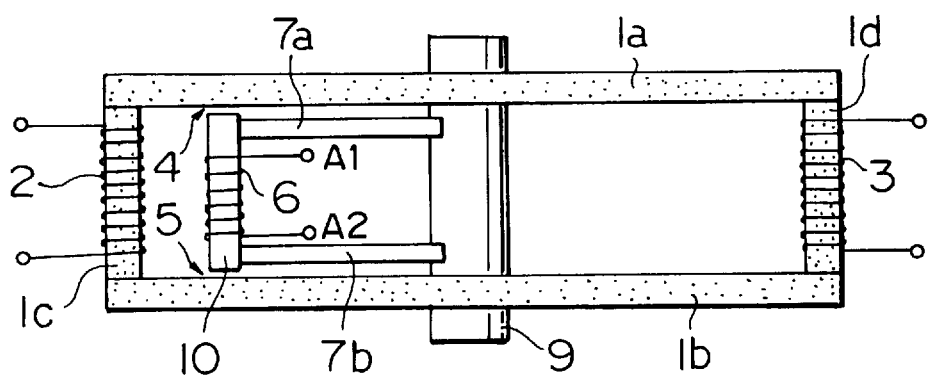
Figure 1C:
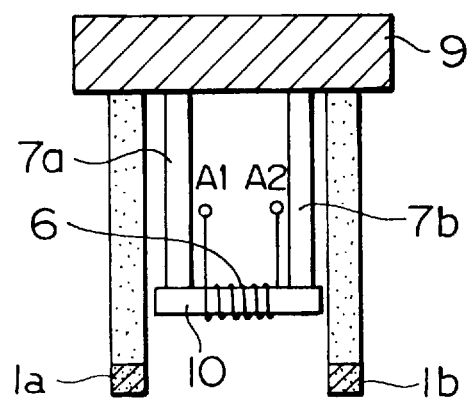

In the embodiment shown in FIGS. 1(a) to 1(c), a magnetic member 1 comprises a pair of semi-circular magnetic member 1a, 1b and a pair of magnetic linking member for positioning in parallel with each other the magnetic members 1a, 1b. Coils 2, 3 are respectively wound around the magnetic coupling members 1c, 1d. Also in a space formed by the semi-circular magnetic members 1a, 1b opposing to each other, a magnetic member 10 with a coil 6 wound therearound is so positioned that gaps 4, 5 are formed. This magnetic member 10 is fixed through a coupling rod 7 to a rotating shaft 9. Herein a radius curvature of the pair of semi-circular magnetic members 1a, 1b is set to a value equal to a length of the coupling rod 7. Namely a radius of rotation of the magnetic member 10, and a center of the curvature of the semi-circular magnetic members 1a and 1b coincides with a center of rotation of the magnetic member 10.

When, accordingly, the rotating shaft rotates, the magnetic member 10 moves between the pair of semi-circular magnetic members 1a and 1b along the direction of their circumferences.

When, with the magnetic position sensor having such configuration as described above, the coil 6 is energized by an energizing AC power from a power source which is not shown herein, a magnetomotive force is generated because of an AC current flowing in the coil 6.

This magnetomotive force is distributed in the magnetic member 1 so as to generate magnetic fluxes interlinking with the coils 2 and 3, and the magnetic fluxes generate an AC electromotive force in each of the coils 2 and 3. Strength of this AC electromotive force is proportional to a change rate of $d\phi/dt$ in an alternative magnetic flux $\phi$ interlinking with the coils 2 and 3. The strength of the alternative magnetic flux interlinking with the coils 2 and 3 changes in accordance with a position of the coil 6. Thus, a rotational position of the coil 6 is detected by making use of the principle that an electromotive force in the coils 2 and 3 changes in accordance with a rotational position of the coil 6.

The magnetic flux generated by the AC-energized coil 6 passes through the gap 4, and enters the semi-circular magnetic member 1a, where the magnetic path branches to two paths, and the two branches magnetic paths pass through the magnetic coupling members 1c and 1d respectively, furthermore pass through the gap 5, then again returns to the coil 6, thus two closed magnetic paths being formed. Also a direction of a magnetic flux in the closed magnetic path changes in accordance with a change of a direction of the AC current or component. Voltages issued from the coils 2 and 3 wound around the magnetic coupling members 1c and 1d in the two branched closed magnetic path are respectively detected and computed by the position detecting circuit shown in FIG. 2, so that a position of the coil 6, or a position of the rotating shaft 9 can be detected. It should be noted that an AC voltage may be supplied to the coil 6 by providing a slip ring (not shown herein) on the rotating shaft 9 and through a brush (not shown herein) slidingly contacting the slip ring. Even though AC voltages appearing across the coils 2 and 3 are detected by supplying an AC power to the coil 6 in this embodiment, an AC voltage generated, in the either one of the coils 2 and 3 as well as in the coil 6 may be detected for producing a position signal while supplying the AC power to the other of the coils 2 and 3.

In the circuits shown in FIG. 2, voltages appearing across the coils 2 and 3 are respectively detected by voltage detectors 12 and 13 the outputs of which are amplified by amplifiers 14 and 15 into outputs V1 and V2, and then computing of V1/(V1+V2) is executed in a computing circuit 16. A result of the computation indicates a position of the coil 6, or a position of a rotating angle of the rotating shaft 9. It should be in this instance noted that the computation of (V1−V2)/(V1−V2) may be executed by the computing circuit 16.

Figure 3A:
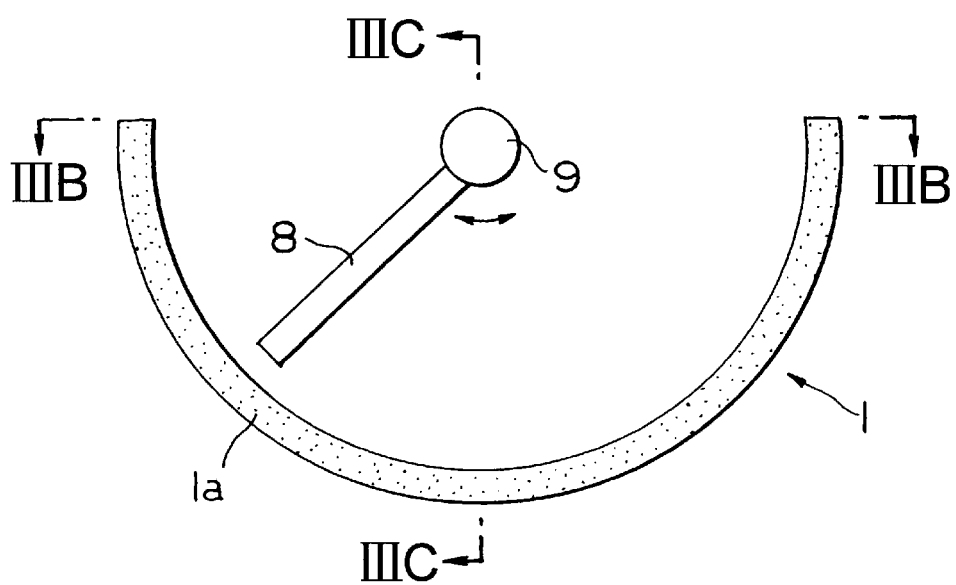
Figure 3B:
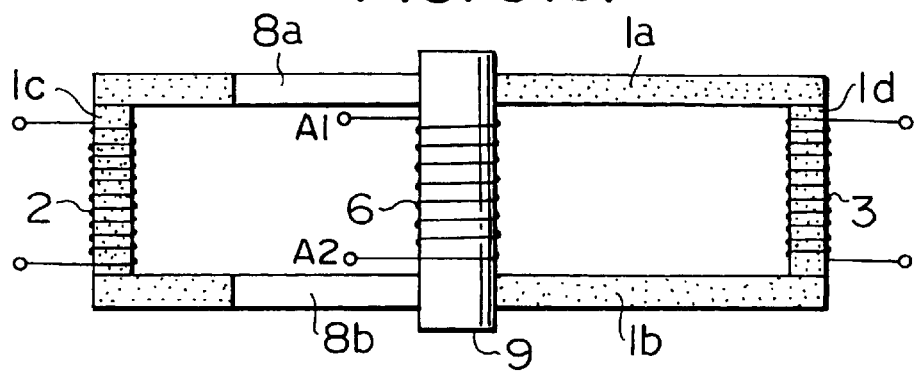
Figure 3C:
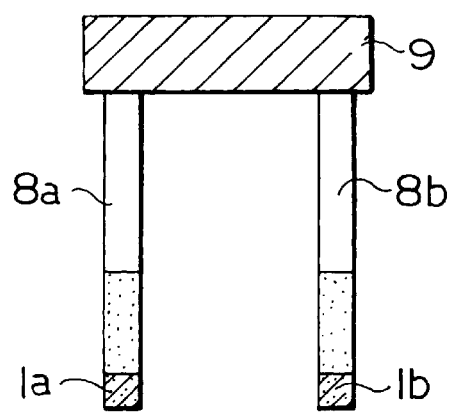

FIG. 3(a) through (c) shows a second embodiment of the magnetic position sensor for detecting an rotating angle in a rotational movement of a member. It should be noted that, in the configuration shown in FIG. 3, the same reference numerals are assigned to the same sections as the corresponding ones in the configuration shown in FIG. 1. As shown in FIG. 3, the magnetic member 1 comprises a pair of semi-circular magnetic members 1a and 1b and a pair of magnetic coupling members 1c and id for positioning the magnetic members 1a and 1b in parallel to each other. And, the coils 2 and 3 are wound around the magnetic coupling members 1c and 1d respectively. The coil 6 is wound around the rotating shaft 9 which can freely rotate, and magnetic path members 8a and 8b are fixed to the rotating shaft 9. Each of the magnetic path members 8a and 8b has a role as a path for delivering a magnetic flux generated from the coil 6 to the semi-circular magnetic members 1a and 1b respectively. The magnetic path members each having the role as described above is made from magnetic material. Within and on semi-circles of the semi-circular magnetic members 1a and 1b, the pair of magnetic path members 8a and 8b are carried and extend in the radial direction of the rotating shaft which can freely rotate so that the magnetic path members 8a and 8b can move relatively to the semi-circular magnetic members 1a and 1b. A radius of rotation of each of the magnetic path members 8a and 8b is set to a value smaller than that of a radius of curvature of each of the pair of semi-circular magnetic members 1a and 1b, and a center of the curvature of the magnetic members coincide with a center of rotation thereof. When, because of the arrangement mentioned above the rotating shaft 9 rotates, the magnetic path members 8a and 8b move along the circumferences of the pair of semi-circular magnetic members 1a and 1b facing each other via the internal wall thereof.

When, with the magnetic position sensor having the configuration as described above, the coil 6 is energized by an AC power supplied from an AC source which is not shown herein, the generated magnetic flux passes through the magnetic path member 8a, and then passes through a gap between the magnetic member 8a and the semi-circular magnetic member 1a. Further, it enters the semi-circular magnetic member 1a, where the magnetic flux is divided to two fluxes, and the branched two magnetic coupling sections 1c and 1d respectively. Further, it passes through a gap between the semi-circular magnetic member 1b and the magnetic path member 8b, and then through the magnetic path member 8b, and finally returns to the coil 6, whereby two closed magnetic paths are formed. A direction of the magnetic path changes in accordance with the changes in direction of the AC current or component.

Figure 8:
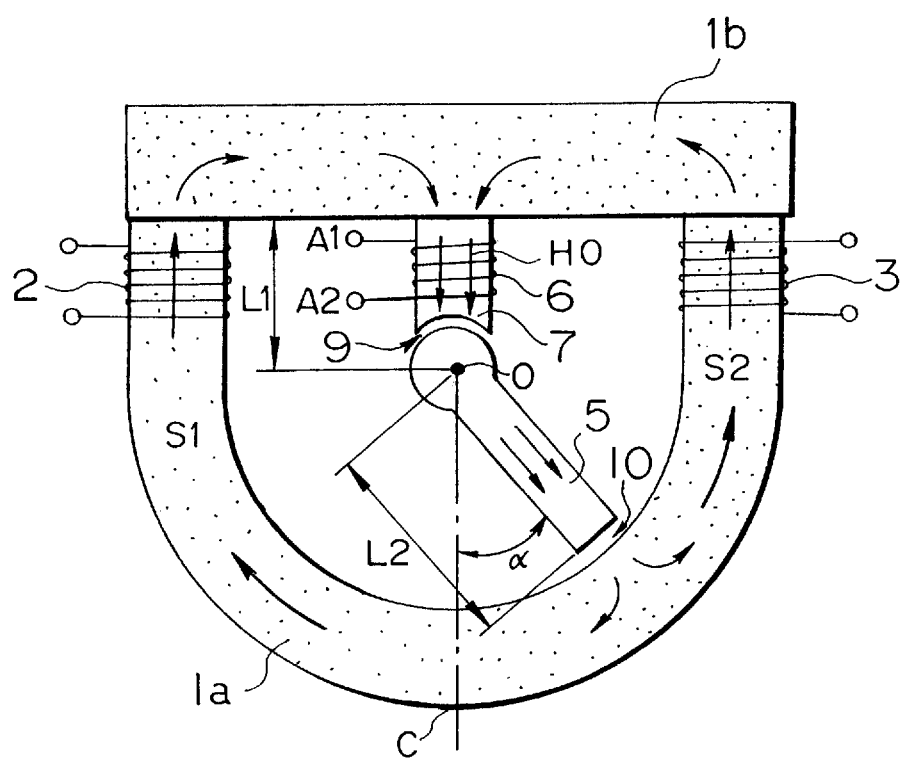
FIG. 8 is a conceptual view illustrating a principle of the magnetic position sensor according to the present invention.

In the closed magnetic path divided into two branched ones as described above, a position of the magnetic path member 8, that is, a rotational angle of the rotating shaft 9 can be detected, as in the first embodiment described above, by the position detecting circuit shown in FIG. 8 by checking voltages appearing across the coils 2 and 3.

It should be noted that a combination of a slip ring and a brush (not shown herein) may be used for energizing the rotating coils 6.

Figure 4A:
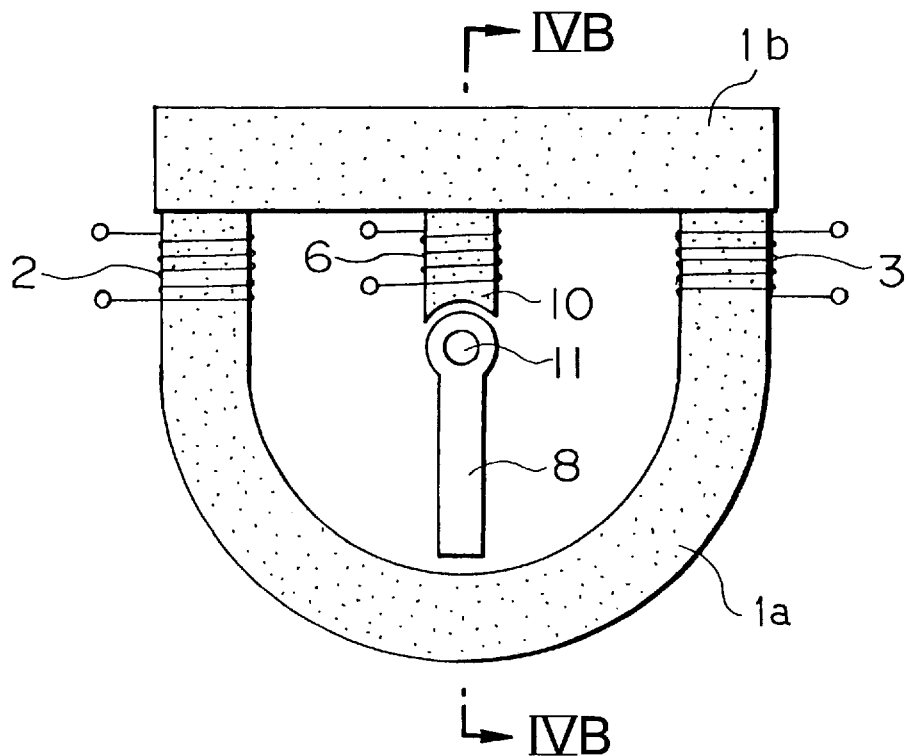
Figure 4B:
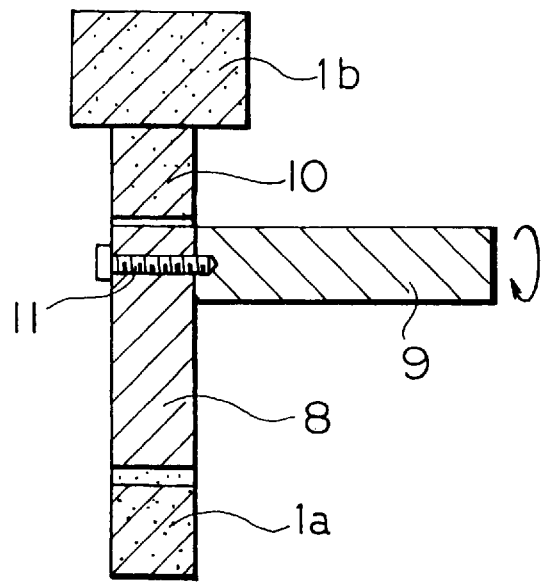

FIG. 4 shows a third embodiment of the magnetic position sensor for detecting a rotational angle in a rotational movement of a movable member. It should be noted that the same reference numbers are assigned to the same section as corresponding sections shown in FIG. 1 and FIG. 3.

In the embodiment shown in this figure, a first magnetic path forming means comprises a semi-circular magnetic members 1a and a rod-shaped magnetic member 1b bridging across two leg portions of the semi-circular magnetic member 1a. A second magnetic path forming means comprises a magnetic member 10 with a coil 6 wound therearound and a magnetic path member 8. A magnetic member 10 and the magnetic path member 8 are located in a space surrounded by the semi-circular magnetic member 1a and rod-shaped magnetic member 1b. One end of the magnetic member 10 is contacted with or fixed to the rod-shaped magnetic member 1b. It is conceivable that the magnetic member 10 and the rod-shaped magnetic members 1b are molded integrally. The magnetic path member 8 is connected through such a coupling means 11 as a screw to a rotating shaft 9, and the magnetic path member 8 is carried on the rotating shaft 9 and rotates within a semi-circle of the semi-circular magnetic member 1a. The other end of the magnetic member 10 is close to a center of the rotation. A radius of rotation of the magnetic path member 8 is set to a value smaller than a radius of curvature of the semi-circular magnetic member 1a, and a center of the curvature thereof coincides with a center of the rotation. A pair of coils 2 and 3 are wound around the semi-circular magnetic member 1a.

When with the magnetic position sensor having the configuration as described above, the coil 6 is energized by an AC power, a magnetic flux generated from the coil 6 passes through the magnetic path member 8, then passes through a gap between the magnetic path member 8 and the semi-circular magnetic member 1a, enters the semi-circular magnetic member 1a, where the magnetic flux is divided to two magnetic fluxes, and the two magnetic fluxes pass through the coils 2 and 3 respectively. It further passes through the rod-shaped magnetic member 1b, and returns to the coil 6, whereby two closed magnetic paths are formed. A direction of the magnetic flux changes in accordance with changes of the direction of the energizing AC current.

In the closed magnetic path branched to two parts as described above, a position of the magnetic path member 8, that is, a rotational angle of the rotating shaft 9 can be detected, as in the first embodiment, by the position detector shown in FIG. 2 which is responsive to the voltages appearing across the coils 2 and 3. With the configuration as described above, a single closed magnetic path is formed by the semi-circular magnetic member 1a and rod-shaped magnetic member 1b, which enables minimization in volume of a magnetic position sensor. Since, furthermore, the coil 6 is fixed, the power supply to the coil 6 can easily be made.

Figure 5A:
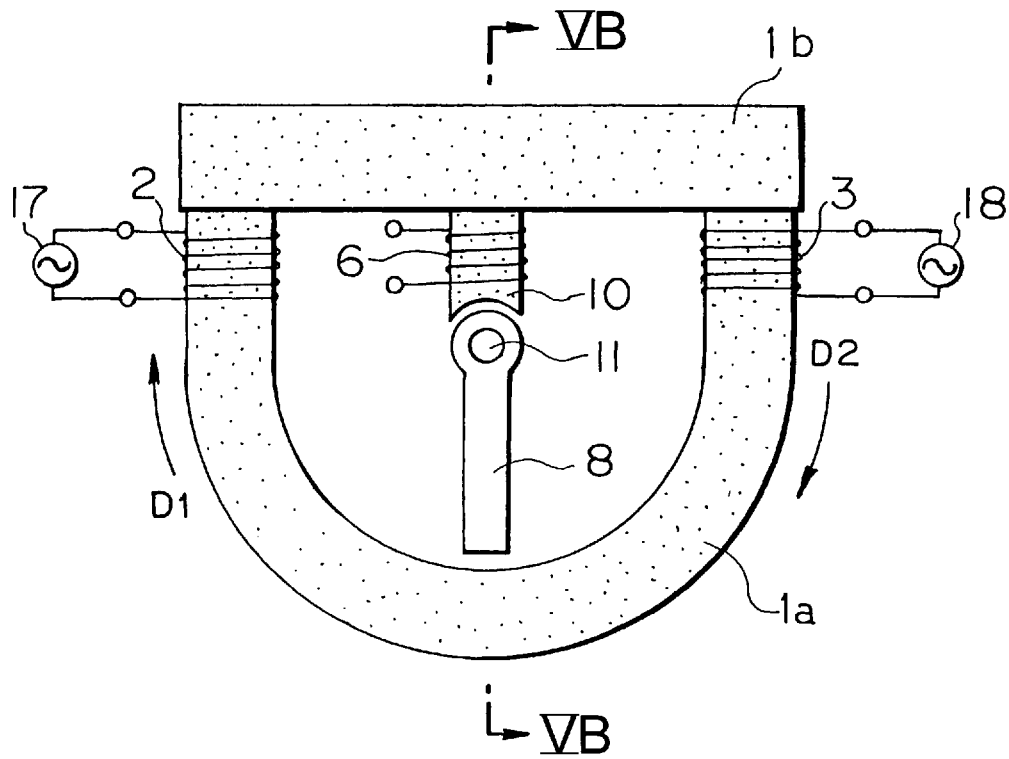
Figure 5B:
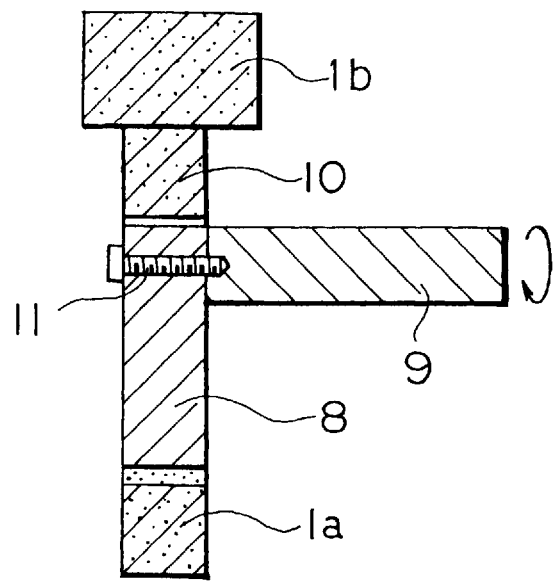

FIG. 5 shows an other embodiment of the present invention. In this embodiment, the coils 2 and 3 are energized by an AC power, and a position of the magnetic path member 8, that is, an angular position of the rotating shaft 9 is detected by detecting an electromotive force generated in the coil 6. The same reference numerals are assigned to the same sections as corresponding sections in the embodiment shown in FIG. 4, and description these section is omitted herein.

In FIG. 5, a frequency of an AC power 17 is the same as that of an AC power 18, and phases of the powers have a constant relation with each other, and the coils 2 and 3 are so wound that the magnetic fluxes generated by these coils will be added to each other in the semi-circular magnetic member 1a and rod-shaped magnetic member 1b.

When the coil 2 is energized by the AC power 17, a magnetic flux generated by the coil 2 passes through the rod-shaped magnetic section 1b (in the direction D1), branches into two parts at a position of the magnetic member 10, one of the two parts passes through the magnetic member 10 as well as the magnetic path member 8, enters the semi-circular magnetic member 1a, and returns to the coil 2, while the other enters the semi-circular magnetic member 1a, passes through the coil 3, and returns to the coil 2. When the coil 3 is energized by the AC power 18, a magnetic flux generated by the coil 3 flow in the direction D2 through the semi-circular magnetic member 1a. The magnetic flux branches into two parts at a position of the magnetic path member 8, and one of the two branched magnetic fluxes passes through the magnetic path member 8 and the magnetic oath member 10, enters the rod-shaped magnetic member 1b, and again returns to the coil 2 while the other branched magnetic flux passes through the coil 2, enters the rod-shaped magnetic member 1b, and returns to the coil 3. A direction of the magnetic flux changes in accordance with the changes of the direction of the energizing current.

In the coil 6, an electromotive force according to a rotational position of the magnetic path member 8 is generated because of a magnetic flux generated from the coil 2 and coil 3. A position of the magnetic path member can be detected by detecting this electromotive force. With the configuration as described above, a position of the magnetic member 8 can be detected, so that it is not necessary to provide a computing circuit or the like and therefore it is possible to make a positional detection with a simple circuit configuration.

As for concrete applications of the magnetic position sensor according to the embodiments shown in FIG. 1 to FIG. 5. For instance, a throttle position sensor can be obtained by connecting the rotating shaft to a throttle valve of an internal combustion engine, a throttle position sensor can be obtained.

Also the magnetic position sensor described above can furthermore be used as a position detecting means in automatic machining tools, automatic carriers or the like, and can preferably be applied to such a purpose as the automation of a factory (FA).

Figure 6A:
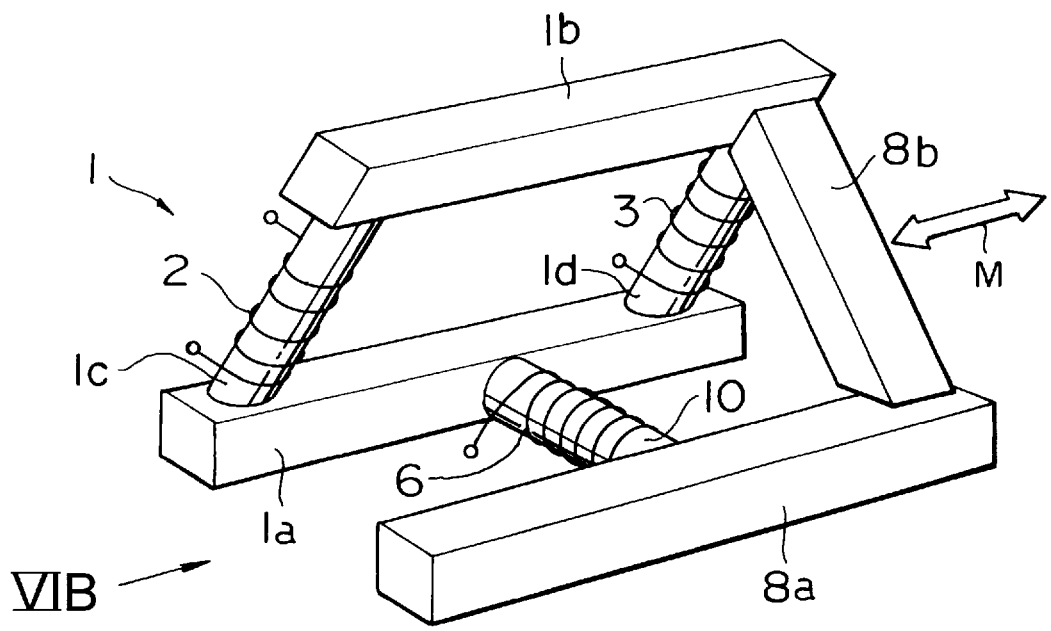
Figure 6B:
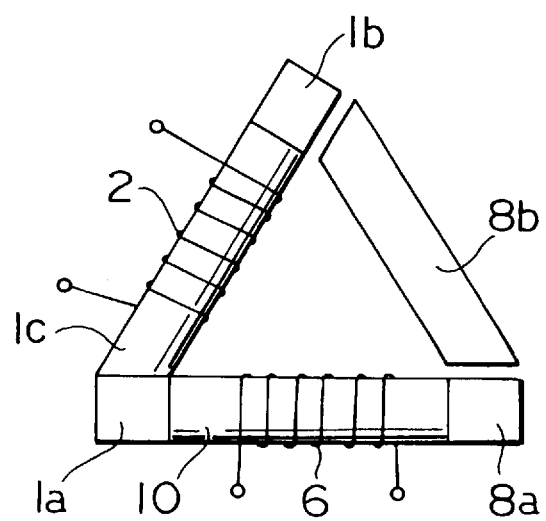

FIG. 6 shows another embodiment of the present invention. The same reference numerals are assigned to the same sections as corresponding sections in FIG. 1, FIG. 3, FIG. 4, and FIG. 5.

In the embodiment shown in this figure, a first magnetic path forming means, that is, a magnetic path member 1 comprises a pair of magnetic members 1a and 1b and a pair of magnetic coupling members 1c and 1d for positioning the pair of magnetic members 1a and 1b in parallel to each other. And the coils 2 and 3 are wound around the magnetic coupling members 1c, 1d respectively. A second magnetic path forming means comprises a magnetic member 10 with the coil 6 wound therearound, a supplementary branched magnetic member 8a in parallel to the magnetic members 1a, 1b, and a movable magnetic member 8b which moves in parallel between the magnetic member 1b and a supplementary branched magnetic member 8a. The magnetic member 10 magnetically connects the magnetic member 1a to the supplementary branched magnetic member 8a. The movable magnetic member 8b is located in a non-contact form between the supplementary magnetic member 8a and the magnetic member 1b. The movable magnetic member 8b is supported by a support member (not shown), and can move, being driven by a specified driving means (not shown), between the internal opposing faces of the magnetic member 1b and supplementary branched magnetic member 8b in the longitudinal direction thereof (in the direction indicated by an arrow M).

When, with the magnetic position sensor having the configuration as described above, the coil 6 is energized by an AC power supplied from a source which is not shown herein, the generated magnetic flux passes through the supplementary branched magnetic member 8a, and then passes through a gap between the supplementary branched magnetic member 8a and movable magnetic member 8b, a movable magnetic member 8b, and a gap between the movable magnetic member 8b and the magnetic member 1b. It further enters the magnetic member 1b, wherein the magnetic flux branches to two parts, and the two branched magnetic fluxes pass through the magnetic coupling members 1c and 1d respectively, and through the magnetic member 1a, thereby returning to the coil 6, whereby two closed magnetic paths are formed. A direction of this magnetic flux changes in accordance with changes in direction of the energizing current. Thus, in the magnetic closed path divided into two parts, a position of the movable magnetic member 8b can be detected by the position detecting sensor shown in FIG. 2, as in the first embodiment, on the basis of voltages appearing across the coils 2 and 3.

Figure 7:
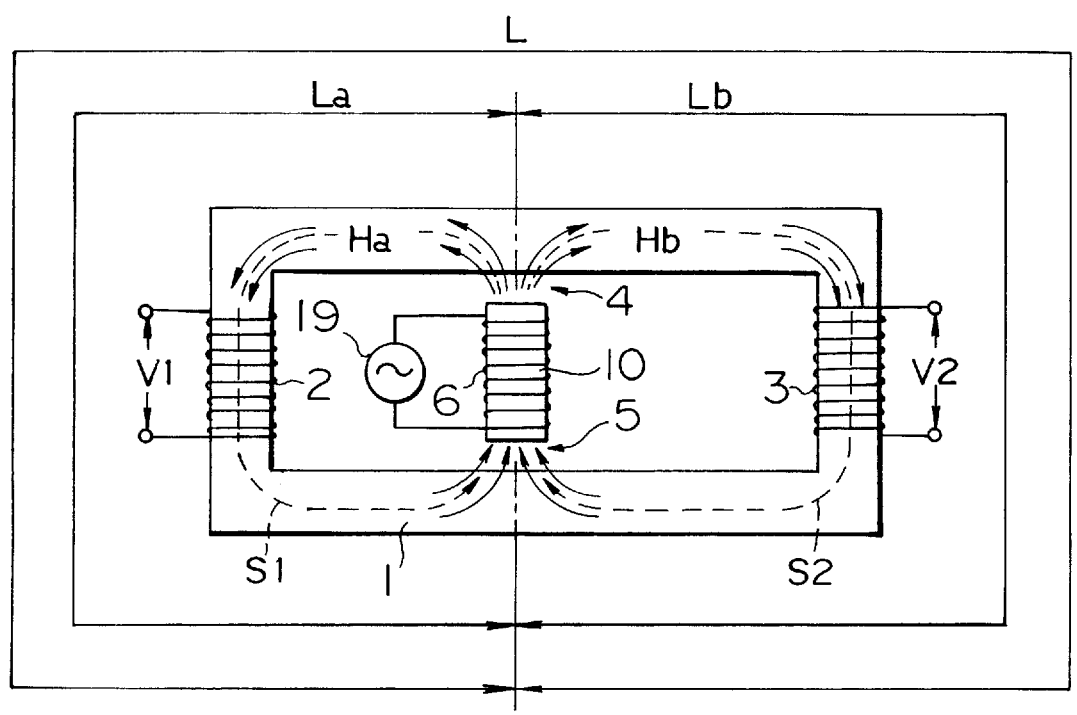
FIG. 7 is a conceptual view illustrating a principle in detection by the magnetic positional sensor according to the present invention.

Next description is made for a principle in detection of the magnetic position sensor according to the present invention with reference to FIG. 7. When, as shown in FIG. 7, the coil 6 is wound around the magnetic member 10, the coil 6 is energized by an AC power 19, a magnetic flux is generated. Amplitude of this magnetic flux is in proportion to a number of windings in the coil 6 and strength of the energizing current. In this figure, the coil 6 is shown to produce an N-pole at the side of the gap 4 and an S-pole but at the side of the gap 5. The magnetic flux changes in direction in accordance with the changes in direction of the energizing current. The pair of coils 2 and 3 are provided on the fixed magnetic member 1. Hereinafter description is made for a path of the magnetic flux generated by the coil 6 and a method of detecting an electromotive force generated in the coils 2 and 3.

The magnetic flux generated from the coil 6 passes through the gap 4, enters the magnetic member 1, then passes through the coil 2 and coil 3 respectively, and through the gap 5, and returns to the coil 6, thus two closed magnetic circuits S1 and S2 being formed respectively.

In this process, the density of magnetic fluxes passing through the two closed magnetic paths S1 and S2 changes according to a position of the coil 6. The coil 6 can move in the longitudinal direction of the magnetic member 1. For instance, when the coil 6 moves to the side of coil 2 (leftward), the density of the magnetic flux interlinking the coil 2 increases, while the magnetic flux interlinking the coil 3 decreases. On the contrary, if the coil 6 moves to the side of coil 3 (rightward), a phenomenon contrary to that described above occurs.

In the next, detailed description is made for the principle in detection using mathematical expressions.

Reference numerals V1 and V2 indicate output voltages appearing across the coils 2 and 3, and α indicates a percentage of a distance (Lb) from one edge against a length L (=La+Lb) of a recirculating, i.e. a first closed magnetic path made by the magnetic member 1.

Assuming herein that a cross sectional area, through which a magnetic path passes, is S; a magnetic permeability of the magnetic member 1 is $\mu$; magnetic permeability of air (a gap) is $\mu_0$; a width of gaps 4, 5 is E; strength of the magnetic fields are H4, H5; strength of magnetic fields generated by magnetic fluxes interlinking the coils 2 and 3 are Ha, Hb; a length of the magnetic member 10 with the coil 6 wound therearound is L6; and magnetic field strength in the coil 6 is H6, the following expression 1 is given from the principle of Ampere's circuital law.

[Expression 1]

$$H4E + HaLa + H5E + H5E + H6L6 = N \cdot i$$

$$H4E + HbLb + H5E + H5E + H6L6 = N \cdot i$$

Herein the product N·i indicates a magnetomotive force appearing in the coil 6.

The expression 1 is simplified to the expression 2 mentioned below.

[Expression 2]

$$HaLa = HbLb$$

Herein, assuming that L=La+Lb and α=Lb/L, the following expression 3 is given.

[Expression 3]

$$\alpha = \frac{Ha}{Ha + Hb}$$

AC voltages V1 and V2 generated in the coils 2 and 3 have voltages in proportion to Ha and Hb, so that the following expression 4 is given.

[Expression 4]

$$\alpha = \frac{V1}{V1 + V2}$$

As clearly understood from the description above, a position of the coil 6 can be detected by on the basis of voltages V1 and V2 generated in the coils wound on the magnetic member 1.

It should be noted that, although in description of the above embodiments as well as in the conceptual drawings, the movable coil 6 is energized and a position of the coil 6 is detected on the basis of voltages generated in the two coils 2 and 3, the coil 2 may be energized and voltages generated in the coils 3 and 6 may be used for detecting the position of the coil 6. Similarly, voltages generated in the coils 2 and 6 may be used while energizing the coil 3.

It should be noted that, in the three detecting methods described above, if either one of coils 2 and 3 is energized, a current generated due to mutual induction may flow in another coil, and a detection error becomes smaller in case where the coil 6 is energized.

The next description is made for a principle in operation of the magnetic position sensor shown in FIG. 4 with reference to the conceptional view shown in FIG. 8. The same reference numerals are assigned to the same sections as corresponding sections in FIG. 4 and description of the same components is omitted herein.

In FIG. 8, a flow of a magnetic flux is indicated by arrows. When the coil 4 is energized by an AC power not shown herein, a magnetic flux is generated. The magnetic flux generated by the coil 4 passes through the gap 9, magnetic path member 5, and gap 10, and thereafter it enters the semi-circular magnetic member 1*a*, where the magnetic flux is branched to two parts, and the two branched magnetic fluxes pass the coils 2 and 3 respectively. It further passes through the rod-shaped magnetic member 1*b*, and returns to the coil 4, whereby two closed magnetic paths S1 and S2 are formed respectively.

In this step, a size of magnetic fluxes passing through the two closed magnetic paths S1 and S2 respectively changes in accordance with a position of the magnetic path member 5. If, for instance, the magnetic path member rotates to the side of coil 3, the size of the magnetic flux interlinking the coil 3 increases, and size of the magnetic flux interlinking the coil 2 decreases in the same proportion. If, on the other hand, the magnetic path member 5 rotates to the side of coil 2, a phenomenon contrary to that described above occurs.

Because of the phenomenon mentioned above, by detecting electromotive forces appearing across the coils 2 and 3, it is possible to obtain an angular position of the magnetic path member 5 against the magnetic member 1, or a rotational angle of the member 5.

The next detailed description is made for a principle of this detection with reference to FIG. 8. Herein it is assumed that a line vertically extending from a center of rotation of the magnetic path member 5 to the magnetic member 1*b* crosses the semi-circular magnetic member 1*a* at a point C. It is further assumed that an angle between the line O-C and the magnetic path member 5 is to be α. (A unit for α is radian.) It is further assumed that the entire path length of a first closed magnetic path through which a magnetic flux passes in the semi-circular magnetic member 1*a* and rod-shaped magnetic member 1*b* is 2L, lengths of magnetic paths in the magnetic member 7 and magnetic path member 5 are L1 and L2 respectively, a radius of rotation of the magnetic path member is r, an area of a cross section through which the magnetic flux passes is S, magnetic field strengths in the magnetic member 7 and magnetic path member 5 are H0 and H3 respectively, magnetic field strengths in the gaps 9, 10 are H9, H10 respectively, lengths of the gaps 9,10 are L9, L10 respectively, magnetic field strengths in the closed magnetic paths S1, S2 are H1, H2 respectively, and a magnetic motive force generated in the coil 4*i* s Ni. Then the following magnetic expressions are obtained from Ampere's circuital law for relations in the closed magnetic paths S1, S2 respectively.

[Expression 5]

$$H0 \cdot L1L + H9L9 + H3L2 + H10L10 + H1(L + r\alpha) = Ni$$

[Expression 6]

$$H0 \cdot L1 + H9L9 + H3L2 + H10L10 + H1(L + r\alpha) = Ni$$

To exclude the common terms from the expressions 5 and 6 above, subtraction of (Expression 5)–(Expression 6) is computed, and a relation can be expressed with respect to the angle α by the following expression 7.

[Expression 7]

$$\alpha = \frac{L}{r} \cdot \frac{H2 - H1}{H2 + H1}$$

When it is further assumed that H2+H1=const (const: Constant), the following expression 8 is obtained.

$$H2 = \frac{r \cdot const}{2L} \alpha + const/2$$

As AC voltages V1 and V2 generated in the coils 2 and 3 have largenesses proportional to H1 and H2, the following expression is obtained.

[Expression 9]

$$V2 = \frac{r \cdot const}{2L} \alpha + const/2$$

When the above expression is rewritten for α, then the following expression 10 is obtained.

[Expression 10]

$$\alpha = (2L/r \text{const}) \cdot (V2 - \text{const}/2) = (L/r) \cdot (V2 - V1)/\text{const}$$

As clearly shown by the expression 7 above, an angular position of the magnetic path member 5 can be obtained by detecting V1 and V2. If, furthermore, it is possible to control (C1+V2) at a constant value, then it becomes possible, as clearly shown by the expression 10 above, to accurately express an angular position of the magnetic path member 5 by means of either V2, or (V2−V1).

The next description is made for an embodiment of a positional signal generating circuit which generates a positional signal indicating a position of the magnetic path member 5 on the basis of an electromotive force generated in the coils 2 and 3 when the coil 4 shown in FIG. 1 is energized. The positional signal generating circuit shown in FIG. 9 comprises voltage detecting circuits 11 and 12, a summing circuit 13, a control circuit 14, and an energizing circuit 15.

Next, description is made for operations of the positional signal generating circuit described above. When the coil 4 is AC-energized by an AC power through the energizing circuit 15, electromotive forces are generated in the coils 2 and 3 (Refer to FIG. 4). Output voltages from the coils 2 and 3 enter the voltage detection circuits 11, 12 respectively, where voltages V1, V2 are detected. The voltages V1 and V2 are summed in the summing circuit 13 into a voltage V3. The voltage V3 from this summing circuit 13 is supplied to either one of the control circuits 14, and the reference voltage Vref is supplied to the other one. In this control circuit 14, a difference signal corresponding to a difference between the voltage V3 and the reference voltage Vref is generated and is supplied to the energizing circuit 15. An energizing current flowing in the coil 4 is controlled by controlling the energizing voltage impressed on the coil 4 in accordance with to the difference signal S1.

In this positional signal generating circuit, it is possible to keep a sum V3 of output voltages from the two coils at a constant value. As indicated by the expression 6 above, a position of the magnetic path member 5 is in proportion to an output voltage from either one of the coils, a position of the magnetic path member 5 can be detected by means of only the voltage V1. In other words, a position of a member to be detected can be detected by detecting a voltage in either one of the plurality of the detection coils.

According to the present invention, the energizing voltage impressed on the coil 4 is controlled so that a sum of output voltages from the two coils will be kept at a constant value, it is possible to always obtain a precise sensor output without being affected by such factors as change associated with passage of time. It should be noted that, although the voltage V1 is used as a positional signal in the embodiment described above, the voltage V2 may be used as a positional signal.

Figure 9:
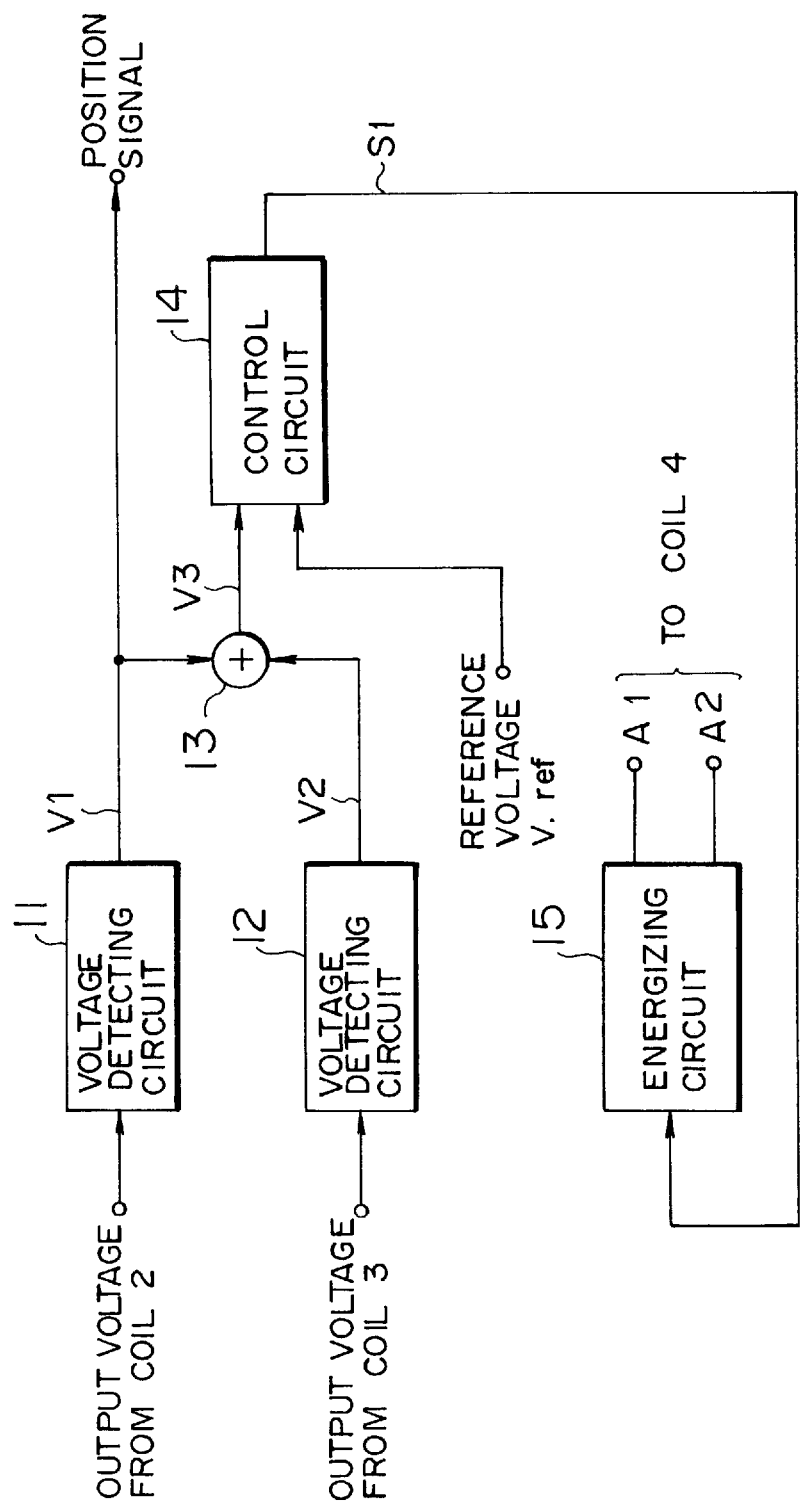
FIG. 9 is a block diagram illustrating configuration of a positional signal generating circuit in the magnetic position sensor according to the present invention.

A concrete example of the positional signal generating circuit shown in FIG. 9 is shown in FIG. 10(a) through 10(d).

Figure 10B:
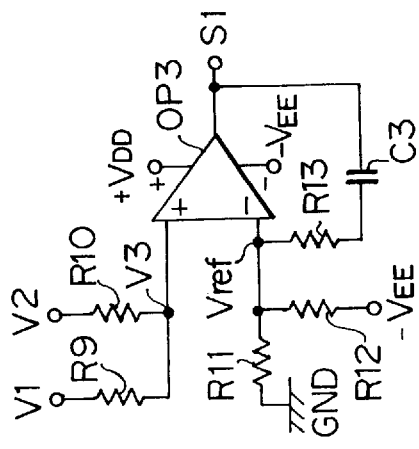
FIGS. 10(a) to 10(f) are electric circuit diagrams illustrating a concrete example of the positional signal generating circuit in the magnetic position sensor according to the present invention.
Figure 10A:
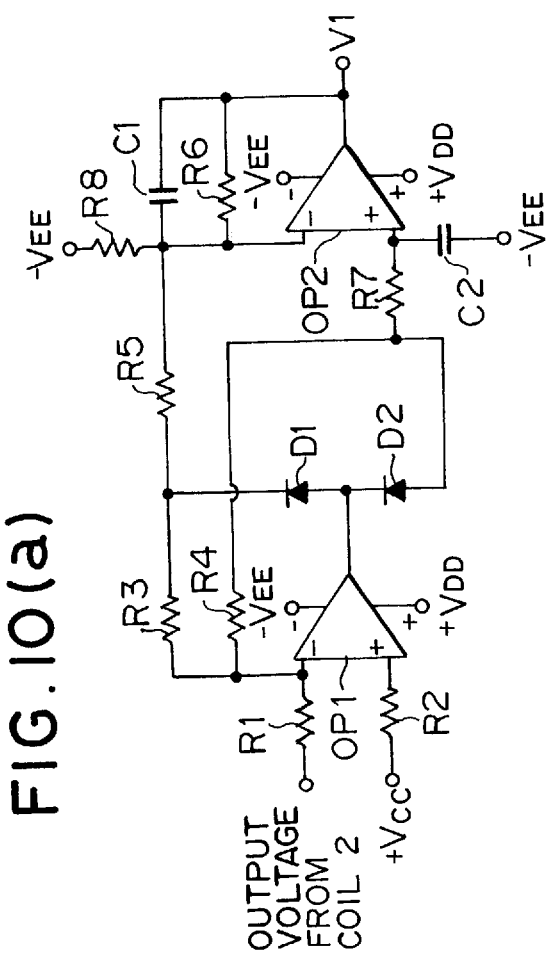

A voltage detecting circuit shown in FIG. 10(a) is a concrete example of the voltage detecting circuit 11 for detecting a voltage appearing across the coil 2. The voltage detecting circuit as described above comprises an amplifying section, a rectifying section, and a smoothing section so as to detect an effective voltage. An output voltage appearing across the coil 2 is amplified by an amplification factor decided by resistances R1 to R6. Diodes D1 and D2 play a role for rectification, and capacitors C1 and C2 execute a smoothing function. It should be noted that R8 is provided for accomplishing offset adjustment. An output from the voltage detecting circuit as described above is nominated V1. A circuit having the same configuration can be used for the voltage detecting circuit 12 for detecting an output voltage appearing across the coil 3.

Figure 10C:
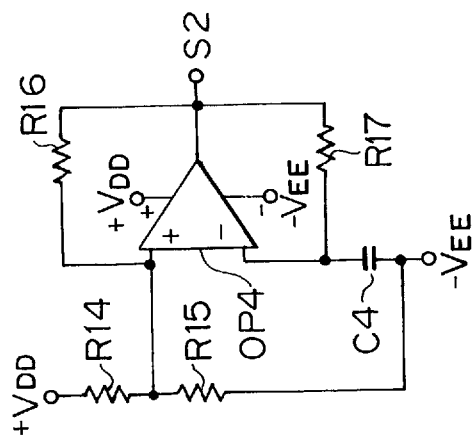
Figure 10D:
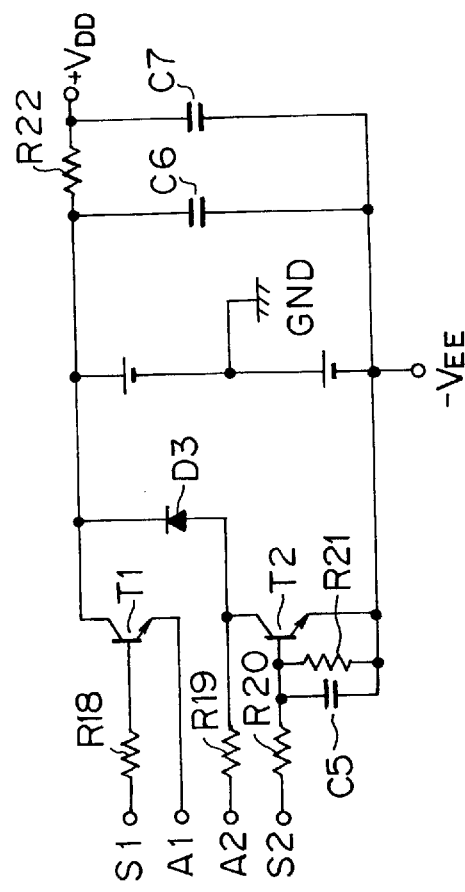

The circuit shown in FIG. 10(b) corresponds to a summing circuit and a control circuit 14 which are shown in FIG. 3. The voltages V1 and V2 detected by the voltage detecting circuits 11 and 12 respectively are supplied to the particular circuit and are summed at a cross point up to voltage V3 which is in turn supplied to a non-inverting input terminal of an amplifier OP3. Inputted to an inverse input terminal thereof is a reference voltage Vref. The reference voltage Vref is determined by GND, supply power VEE, and resistances R11 and R12. A difference signal S1 obtained by integrating in time a voltage difference between V3 and Vref is outputted. The energizing circuit 15 in FIG. 9 is constituted by an oscillation circuit in FIG. 10(C) and a driver circuit in FIG. 10(d). The oscillation circuit in FIG. 10(C) is a circuit generating a square wave output S2, and a cycle of the square wave output S2 is determined by a capacitor C4 and resistances R16 and R17. A square wave output S2 generated in the oscillation circuit in FIG. 9(d) and a difference signal S1 generated in the control circuit 14 are supplied into a driver circuit in FIG. 10(d) respectively. A square wave output S2 makes the transistor T1 turn ON or turn OFF at a prespecified cycle, and a square wave voltage is exerted to the A2 terminal of the coil 4. The difference signal S1 makes the transistor T1 turn ON or turn OFF and adjusts a square wave voltage supplied to the A1 terminal of the coil 4, and controls amplification of the square wave voltage exerted onto the coil 4.

Figure 10E:
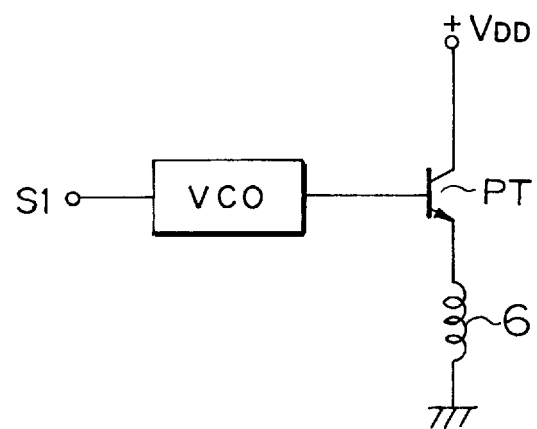
Figure 10F:
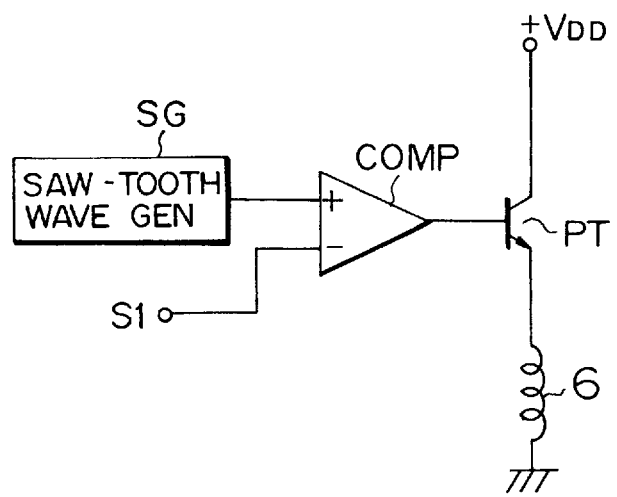
Figure 11:
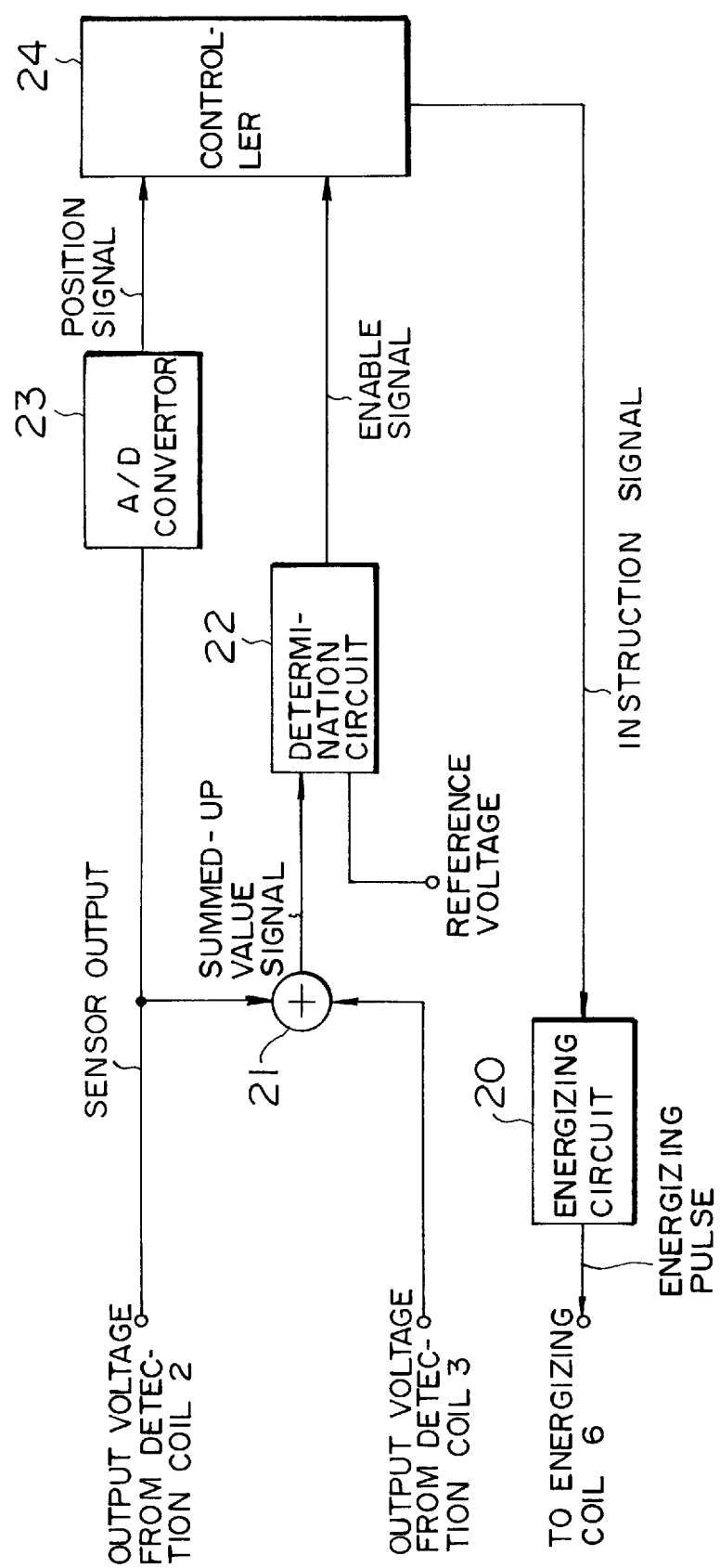
FIG. 11 is a block diagram illustrating one embodiment of a positional signal generating circuit for obtaining a positional signal on the basis of output signals from the sensors shown in FIG. 1(a) to FIG. 1(c), FIG. 3(a) to FIG. 3(c), FIG. 4(a) to FIG. 4(b), and FIG. 6(a) to FIG. 6(b).

In the embodiment described above, the amplification of the square wave voltage supplied to the coil 4 is controlled. However, as shown in FIG. 10(e), the coil 6 may be energized by an output from a power transistor PT whose gate receives an output of a VCO of which output frequency is controlled by the difference signal S1. In the configuration described above, frequency of the square wave voltage supplied to the coil 4 is controlled. As shown in FIG. 10(f), a sawtooth outputted from the sawtooth generating circuit SG and a difference signal S1 are supplied to the comparator COMP, and the coil 6 may be energized by an output from a power transistor PT which receives at its gate a square wave voltage outputted from the comparator COMP. In the configuration described above, the duty ratio of the square wave voltage supplied to the coil 6 is controlled. FIG. 11 is a block diagram illustrating an embodiment of the position signal generating circuit having a determining function for obtaining a position signal indicating an angular position of the movable magnetic member 7a, 7b, 8, 8a or 8b on the basis of an AC voltage appearing across the coils 2 and 3 by energizing the energizing coil 6 of the magnetic position sensor described above.

The position signal generating circuit shown in FIG. 11 comprises an energizing circuit 20, a summing circuit 21, a determination circuit 22, an A/D converter 23, and a controller 24.

The operation of the position signal generating circuit mentioned above will be explained below.

Figure 12A:
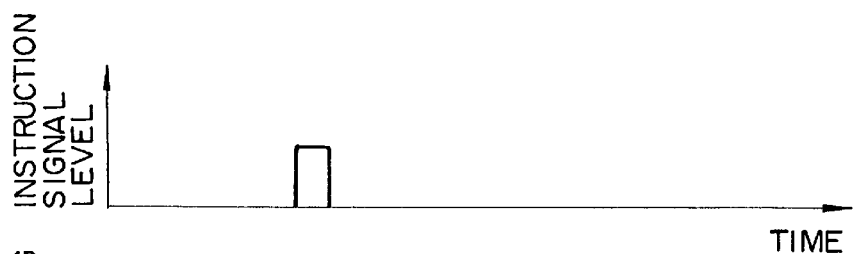
FIGS. 12(A) to 12(E) are wave form charts illustrating signal wave forms in a major section shown in the circuit of FIG. 11.
Figure 12B:
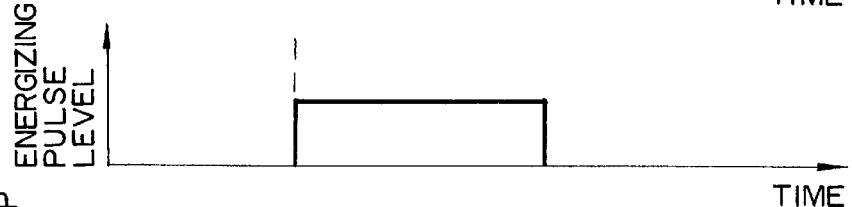
Figure 12C:
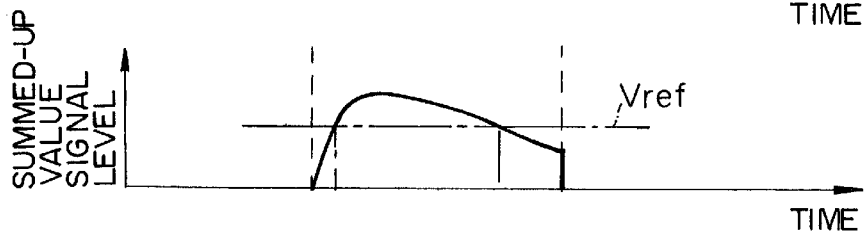
Figure 12D:
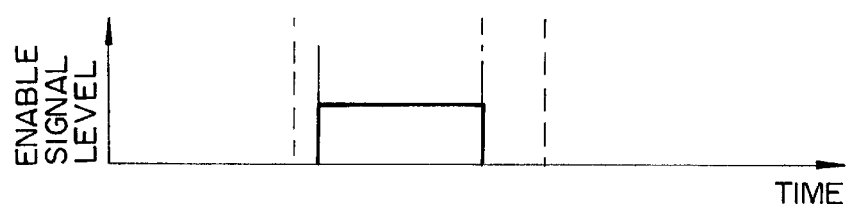
Figure 12E:
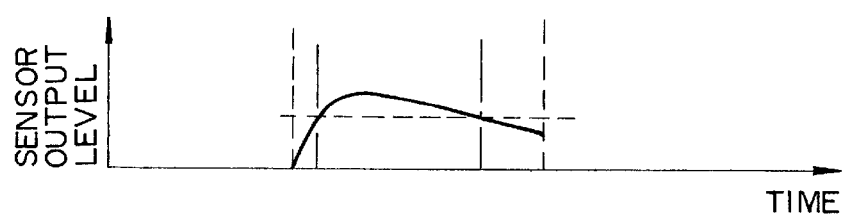

At first, the controller 24 supplies such an instruction signal as shown in FIG. 12(A) to the energizing circuit 20. The energizing circuit 20 generates an energization pulse having such a rectangular wave as shown in FIG. 12(B) in response to the instruction signal, and energizes the energizing coil 6 with an AC. AC voltages are induced in the detection coils 2 and 3 respectively by a magnetic flux emitted from the energizing coil 6 energized with an AC described above. The AC voltage induced in the detection coils 2 and 3 described above is supplied to the summing circuit 21, summed therein, and becomes a summed-up value signal as shown in FIG. 12(C). Then the summed-up value signal from the summing circuit 21 and the reference voltage Vref are supplied respectively to the determination circuit 22. As shown in FIG. 12(C), the determination circuit 22 generates an enable signal of a logical value of ⌈1⌋ as shown in FIG. 12(D) and supplies it to the controller 24 when an instantaneous value of summed-up value signal is not less than the reference voltage Vref. The AC voltage induced in the detection coil 2 has such a wave form as shown in FIG. 12(E), and is supplied to the A/D converter 23 as a sensor output for obtaining a position signal, and is A/D-converted. The controller 24 catches a leading edge or a trailing edge of the enable signal and fetches thereto the sensor output at that time from the A/D converter 23 so as to obtains a position signal indicating a position of the movable magnetic member 7 or 8. The position signal may be supplied to other devices if required.

It should be noted that the instruction signal described above is generated by the controller 24 when the sensor output i.e. the position signal is required. The instruction signal may be an instruction pulse appearing in synchronism with an ignition timing when the sensor is used as a throttle opening sensor for the internal combustion engine.

Although a position signal is obtained based on an output from the detection coil 2 in the position signal generating circuit mentioned above, an output from at least either of the detection coils 2 and 3 may be assigned to a sensor output for obtaining the position signal.

It should be noted that even though a rectangular wave is used as the energizing pulse in the embodiment described above, a sinusodial wave may be used therefor. Namely, it may be enough that at least an AC component is included therein as an energization current flowing in the energizing coil 6.

In the position signal generating circuit having the configuration described above, when an instantaneous value of a summed-up value of the AC voltage induced in the detection coils 2 and 3 takes a predetermined level, a value indicating the AC voltage at the time is regarded as a position signal for the sensor by an edge of an enable signal, so that a position of the movable member to be detected can accurately be detected. Furthermore, an angular position of a movable member to be detected is detected by the position signal only when an enable signal exists, so that it becomes possible to reduce power consumption.

Figure 13:
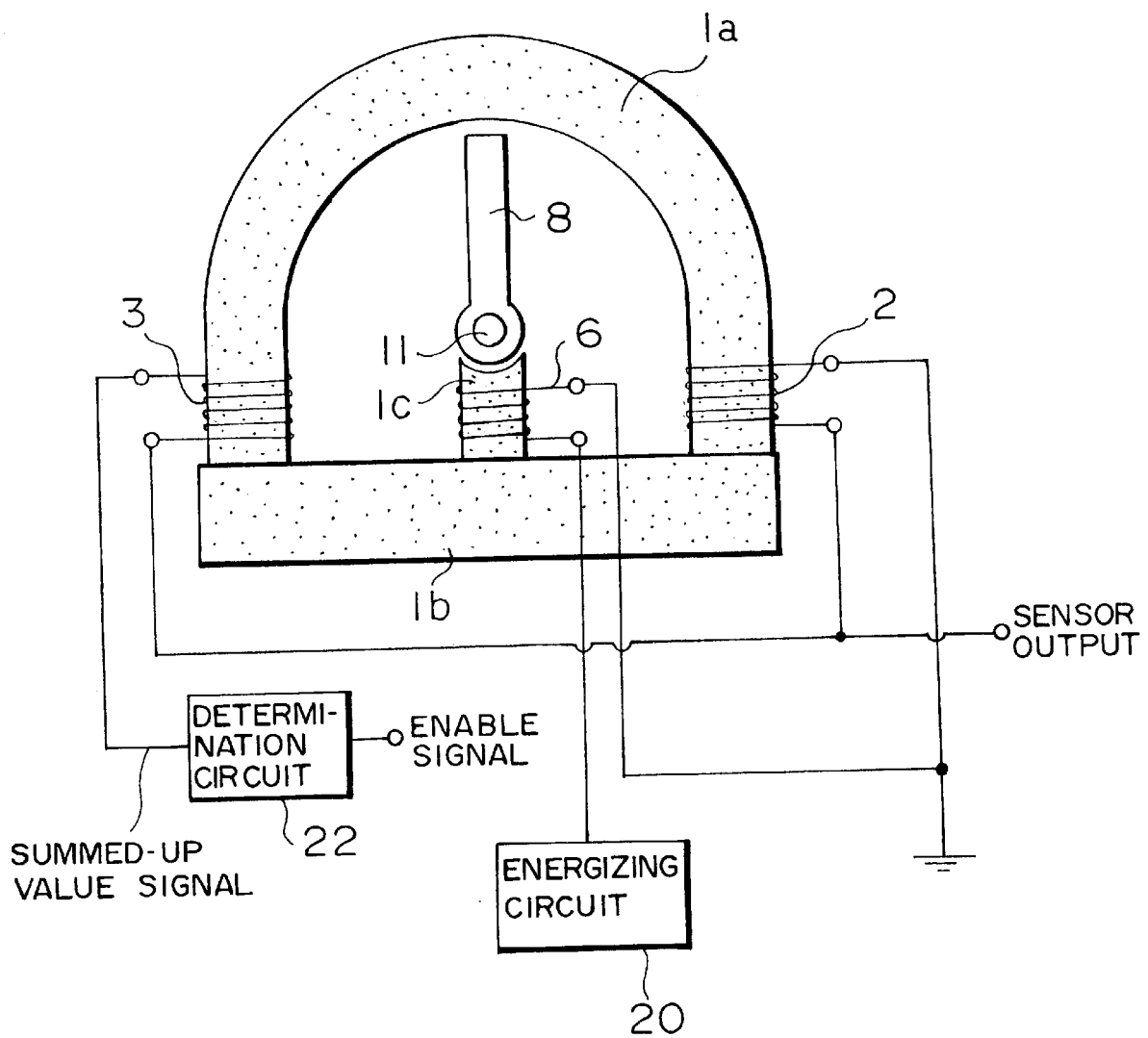
FIG. 13 is a general block diagram illustrating a second embodiment illustrating construction of the magnetic position sensor according to the present invention.

If, as shown in FIG. 13, a summed-up value of the AC voltage induced in the detection coils 2 and 3 is obtained by connecting the detection coils 2 and 3 in series with each other and detecting a voltage across the series connection of the coils 2 and 3, a summing circuit is unnecessary and cost reduction is possible.

Then, some examples of the energizing circuit 20 in FIG. 11 are shown in FIG. 14, FIG. 16, FIG. 18, and FIG. 19.

Figure 14:
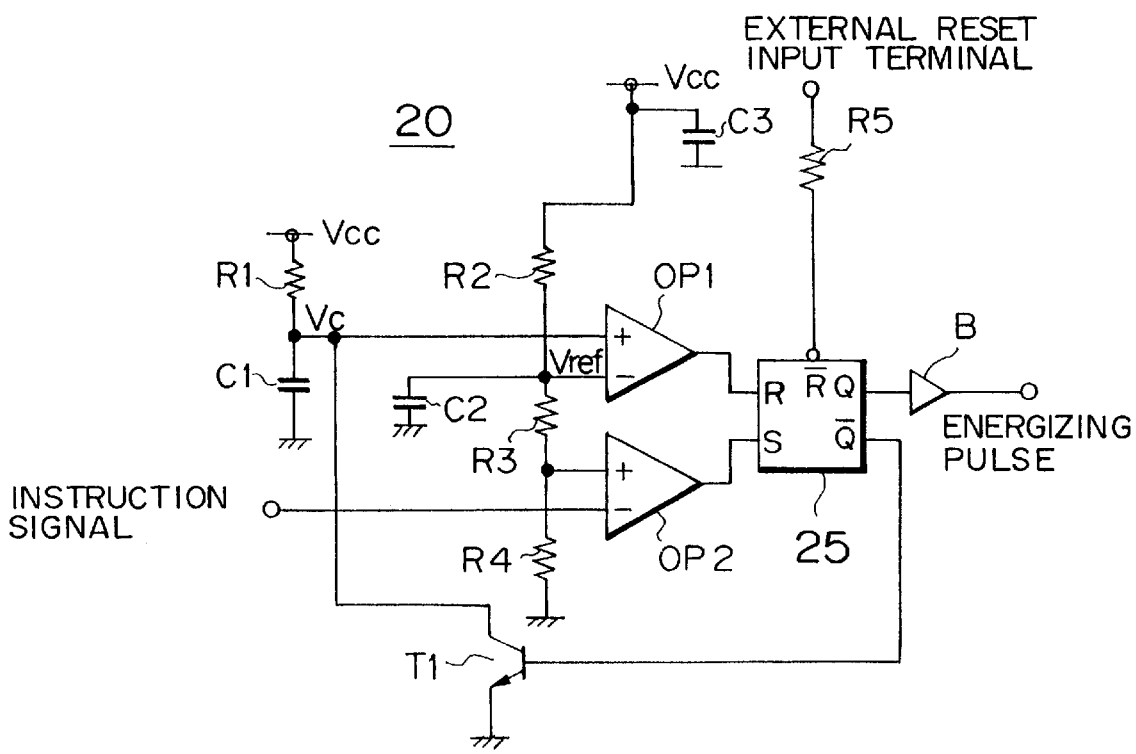
FIG. 14 is an electric circuit diagram illustrating a concrete example of the energizing circuit shown in FIG. 11.

In the example shown in FIG. 14, the energizing circuit 20 shown in FIG. 11 comprises a monostable multivibrator. The multivibrator comprises comparators OP1 and OP2 of operating amplifiers, capacitors C1 to C3, resistances R1 to R5, an RS flip-flop 25 and a buffer amplifier B.

Next description is made for basic operation for the circuit shown in FIG. 14.

In the monostable multivibrator shown in FIG. 14, the discharging transistor T1 has been turned ON before the appearance of the instruction signal emitted from the controller 24 of FIG. 11 and therefore the voltage VC across the capacitor C1 is kept at OV. If a pulse of the instruction signal of a value "L" is supplied thereto, the RS flip-flop 20 is set, a Q output becomes "H", and an energizing pulse is emitted via the buffer amplifier B. At this moment, the discharging transistor T1 is turned OFF, and the capacitor C1 starts charging. The comparator OP1 compares the voltage VC across the capacitor with the reference voltage Vref, and if the capacitor voltage VC has reached Vref, the RS-flip-flop 20 is reset, and the Q output becomes "L". Then the discharging transistor T1 is again turned ON and the capacitor discharges.

Herein, a pulse width of the energizing pulse is dependent on a time constant of capacitor C1 and resistance R1. While a reference voltage Vref is determined by the divider constituted by the resistances R2 to R4.

Figure 15A:
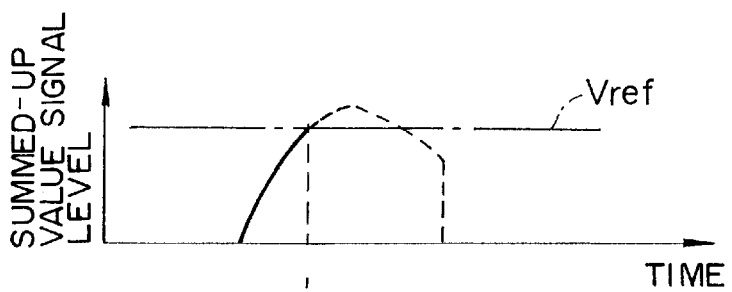
FIGS. 15(A) to 15(C) are wave form charts respectively illustrating signal wave forms in a major section of the circuit shown in FIG. 14.
Figure 15B:
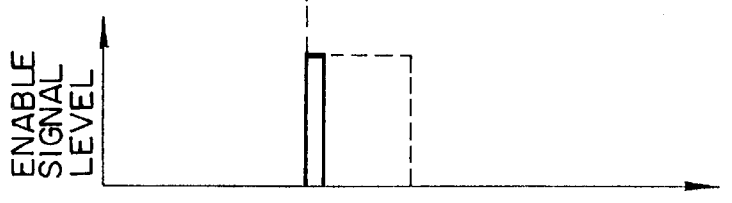
Figure 15C:
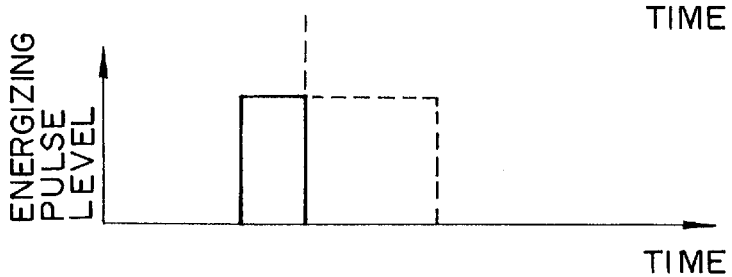

An external reset terminal R is provided in the RS-flip-flop. If a reset-input of the external reset terminal R is set to "L", the RS-flip-flop 25 is reset, the Q output becomes "L", and generation of an energizing pulse is terminated without respect to the input to other R and S terminals. If configuration is such that generation of an energizing pulse is terminated when an output from the determination circuit 25 in FIG. 11 is connected to the external reset input terminal and an enable signal is supplied thereto, the energizing pulse is terminated after the detection of an effective sensor output, and therefore unnecessary power consumption can be saved. FIG. 15(a) to 15(c) show wave forms of the respective signals in case an energization pulse is terminated in response to an enable signal. If, in FIG. 14, such an energizing pulse as shown in FIG. 15(C) is emitted, such a summed-up value signal as shown in FIG. 15(A) is obtained, and such an enable signal as shown in FIG. 15(B) is generated when the summed-up value signal is not less than a reference value Vref, which makes the energizing pulse to vanish as shown in FIG. 15(C) when the enable signal makes a LOW to HIGH transition. It should be noted that, in this case, when the enable signal makes the L to H transition, the controller 24 fetches thereto an output signal level from either the detection coils 2 or 3 as a position signal.

Figure 16:
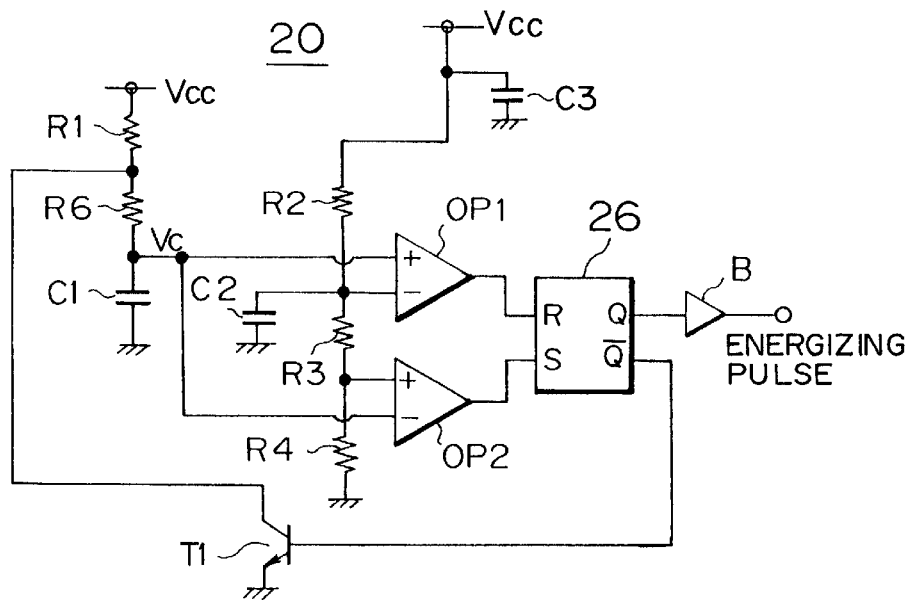
FIG. 16 is an electric circuit diagram illustrating a second embodiment of the energizing circuit shown in FIG. 11.

In the example shown in FIG. 16, the energizing circuit 20 shown in FIG. 11 comprises an astable multivibrator. In the astable multivibrator circuit in FIG. 16, the same reference numerals are assigned to the same portions as those in common with the monostable multivibrator in FIG. 14, and the description regarding these portions is omitted herein.

Figure 17A:
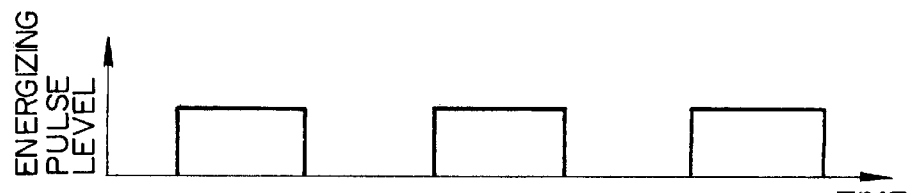
FIGS. 17(A) to 17(D) are wave form charts respectively illustrating signal wave forms in a major section of the circuit of FIG. 16.
Figure 17B:
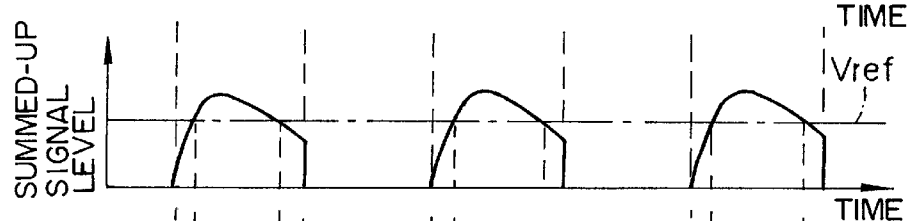
Figure 17C:
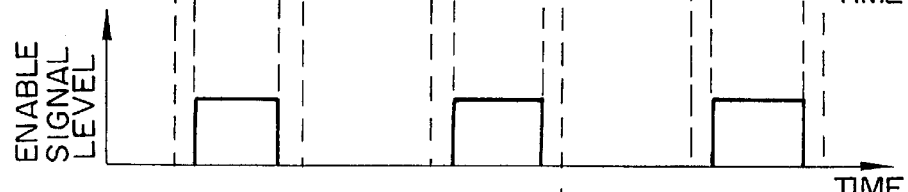
Figure 17D:
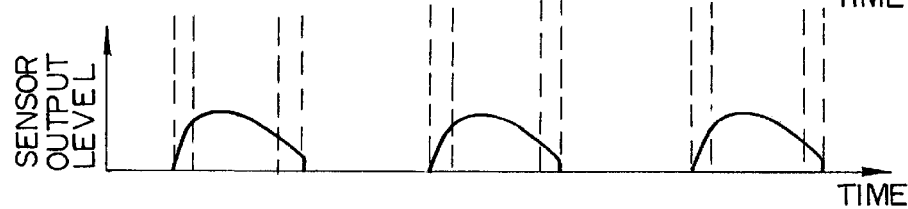

The astable multivibrator in FIG. 16 repeats automatically charging to and discharging from the capacitor C1 and generates energizing pulses. The comparator OP1 resets the RS-flip-flop 20 and discharges if a voltage VC in the capacitor C1 rises, for instance, up to ⅔ of the supply voltage VCC. The comparator OP2 monitors the VC during the discharging, and if the VC drops, for instance, down to ⅓ of the VCC, the comparator sets the RS-flip-flop 20 and switches it to charging. The energizing pulse is repeatedly generated by its repeating of the operation. FIGS. 17(A) to 17(D) are wave form charts respectively illustrating signal wave forms generated in the position signal generating circuit in FIG. 11, and if such an energizing pulse as shown in FIG. 17(A) is emitted from the astable multivibrator in FIG. 16, such summed-up value signal, enable signal, and sensor output as shown in FIGS. 17(B),(C), and (D) are generated respectively. In this case, an instruction signal for reading from the controller 24 is not required and an enable signal and a position signal are intermittently supplied to the controller 24.

Figure 18:
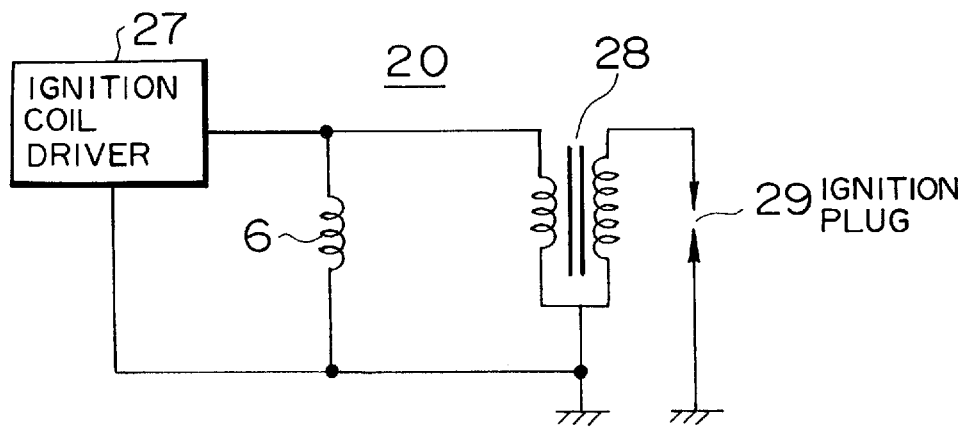
FIG. 18 is an electric circuit diagram illustrating a concrete example of a third embodiment of the energizing circuit shown in FIG. 11.
Figure 19:
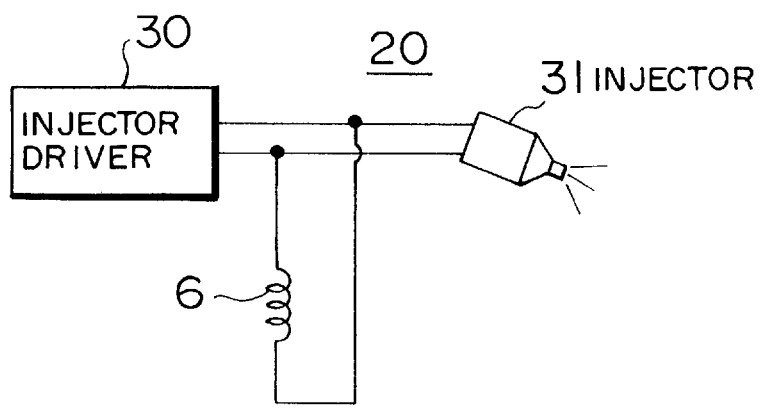
FIG. 19 is an electric circuit diagram illustrating a concrete example of a fourth embodiment of the energizing circuit shown in FIG. 11.

In the example in FIG. 18, the energizing circuit 20 in FIG. 11 comprises an ignition coil driver circuit for an internal combustion engine incorporated in a vehicle. This example shows that a circuit for driving an ignition coil for an internal combustion engine incorporated in a vehicle can be exploited as the energizing circuit when the magnetic position sensor according to the present invention is incorporated in a vehicle.

Namely the energizing coil 6 is connected to the ignition coil 28 in parallel to each other. The energizing coil 6 is energized by an energizing pulse emitted from the ignition coil driver 27. In the energizing coil 6, the impedance thereof is larger as compared to the ignition coil 28, so that no actual effect is given onto the ignition coil 28. In the embodiment in FIG. 19, the energizing circuit 20 in FIG. 11 comprises an injector driver circuit for an internal combustion engine incorporated in a vehicle. If, namely, the magnetic position sensor according to the present invention is incorporated in a vehicle, a circuit for driving an injector for an internal combustion engine incorporated in a vehicle can be exploited as the energizing means. Namely the energizing coil 6 is connected to the injector 31 in parallel to each other, and the energizing coil 6 is energized by an energizing pulse from the injector driver 30. It should be noted that, in the energizing coil 6, the impedance thereof is larger as compared to the injector 31, so that no actual effect is given onto the injector 31.

It should be noted that, similarly, the energizing coil 6 may be energized by an energizing means for energizing a solenoid valve such as an EGR valve (an exhaust gas recirculation valve) used in a motor vehicle.

Figure 20:
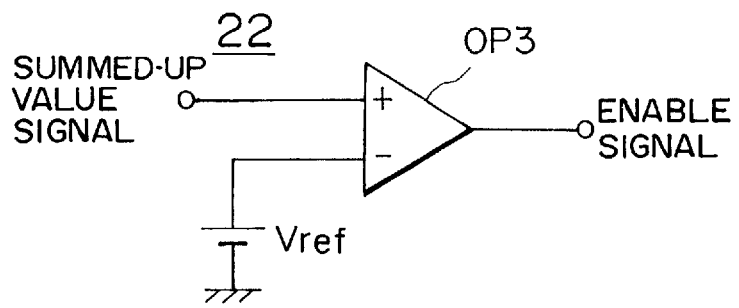
FIG. 20 is an electric circuit diagram illustrating a concrete example of a determination circuit shown in FIG. 11.
Figure 21:
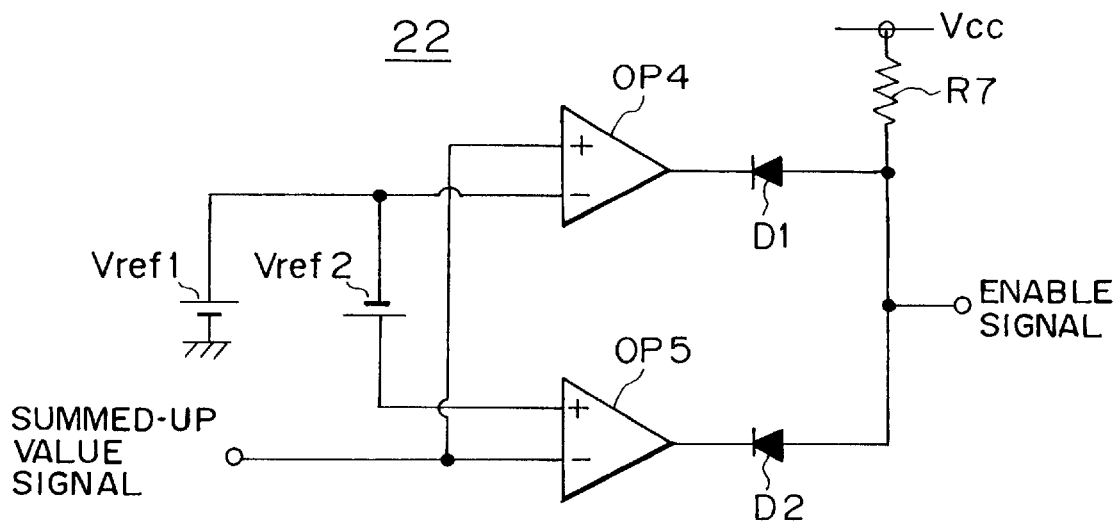
FIG. 21 is an electric circuit diagram illustrating a second concrete example of the determination circuit shown in FIG. 11.

FIG. 20 and FIG. 21 are electric circuit diagrams each illustrating concrete configuration of the determination circuit 22.

FIG. 20 is a concrete example of the determination circuit 22 shown in FIG. 11, and a summed-up value signal issued from the summing circuit in FIG. 11 is supplied to a non-inverse input terminal of the comparator OP3 of an operating amplifier, and the reference voltage Vref to an inverse input terminal, respectively. The comparator OP3 generates a logical value of "1" as an enable signal when the summed-up value signal is not less than the reference voltage Vref.

In the concrete example shown in FIG. 21, the determination circuit shown in FIG. 11 comprises a window comparator.

Figure 22:
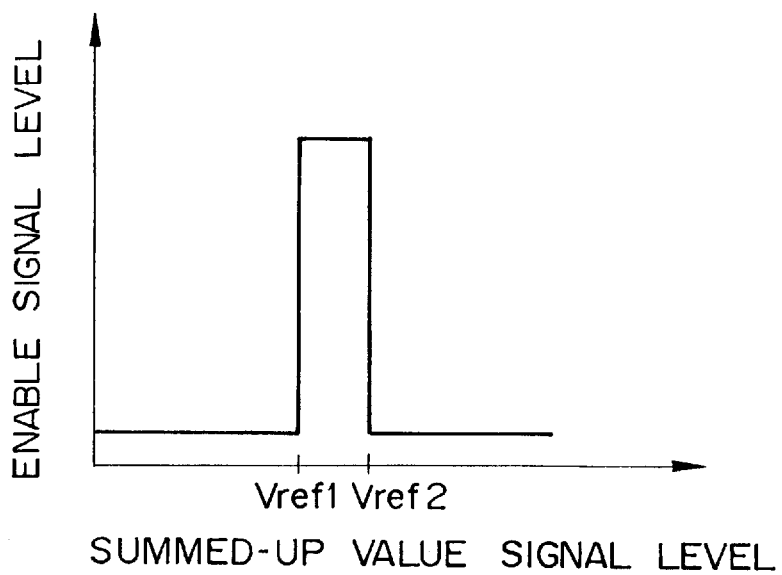
FIG. 22 is a view illustrating output characteristics of the circuit shown in FIG. 21.

In the window comparator shown in FIG. 21, the summed-up value signal is supplied to a non-inverse input terminal of a comparator OP4 of an operating amplifier as well as to an inverse input terminal of a comparator OP 5 of an operating amplifier, and the reference voltage Vref 1 is supplied to a non-inverse input terminal of the comparator OP4, while the reference voltage Vref 2 is supplied to an inverse input terminal of the comparator OP5 respectively. Herein the reference voltage has the relation of vref 1<Vref 2. The window comparator generates a logical value of "1" as an enable signal, as shown in FIG. 22, when the summed-up value signal takes a value within a range between Vref 1 and Vref 2.

It is to be noted that the determination circuit 22 shown in FIG. 11 generates an enable signal when an instantaneous value of the summed-up value signal is higher than a predetermined level. It can be determined that the sensor output is stable when an instantaneous value of the energizing current flowing in the energizing coil 6 is not less than a predetermined level.

FIG. 23 therefore shows a determination circuit 22' which issues an enable signal when an instantaneous value of the energizing current flowing in the energizing coil 6 is higher than a predetermined level. In the determination circuit 22' shown in FIG. 23, a resistor 8 for current detection is connected in series to the energizing coil 6. When the energizing coil 6 is energized by an energizing pulse, as shown in FIG. 24 (C), emitted from the energizing circuit 20, an energizing current flows in the energizing coil 6. The resistor 8 converts the energizing current as described above to a corresponding voltage Vi as shown, for instance, in FIG. 24 (A), and supplies the voltage Vi to a non-inverse input terminal of the comparator OP6 of an operating amplifier. To a inverse input terminal of the comparator OP6, the reference voltage Vref is supplied. The comparator OP6 generates an enable signal as shown in FIG. 24(B) when an instantaneous value of the voltage Vi is not less than the reference voltage Vref.

FIG. 25 is a sample hold circuit which holds either one of sensor outputs, that is, output signals from the detection coils as a sample in response to the enable signal, so that the signal held as sample is used as a position signal of the position sensor.

The sample hold circuit shown in FIG. 25 comprises an including a sampler 32, a hold capacitor C4, and an operating amplifier OP7. The sample hold circuit sample-holds, a sensor output having such a waveform as shown in FIG. 26(A) in response to the enable signal having such a waveform as shown in FIG. 26(B) and then generates the sample-held signal having such a waveform as shown in FIG. 26(C), as the position signal. To describe in more detail, the sampler 32 is closed while an enable signal exists, and the sampler 32 is opened while the enable signal does not exist. When the sampler 32 is closed, the sensor output is charged to and maintained in the capacitor C4. Charging to the capacitor C4 is executed with a product of the resistance R in the sampler 32 when closed and a hold capacitor C4, namely a time constant of R·C4. When the sampler 32 is opened, the charged voltage in the capacitor C4 is maintained, so that the sample-held signal as shown in FIG. 26(C) which is the position signal is generated. With this configuration, even when an enable signal does not exist, a position signal is outputted, which means that a position signal can always be obtained as seen from FIG. 26(C). It should be noted that, in the sample hold circuit described above, the enable signal generated by the window comparator shown in FIG. 21 may be used.

Figure 27A:
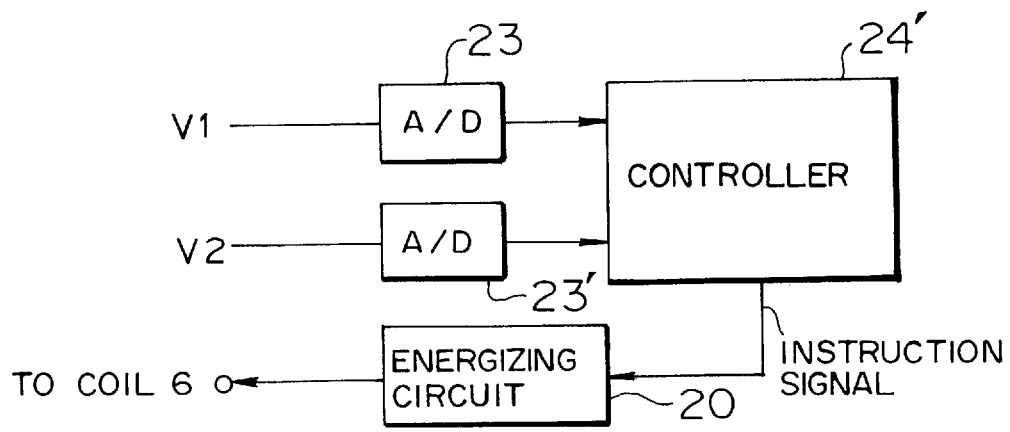
FIG. 27(a) is a block diagram illustrating configuration of a sensor for generating a position signal according to data obtained by digitally processing an output voltage from a detection coil.
Figure 27B:
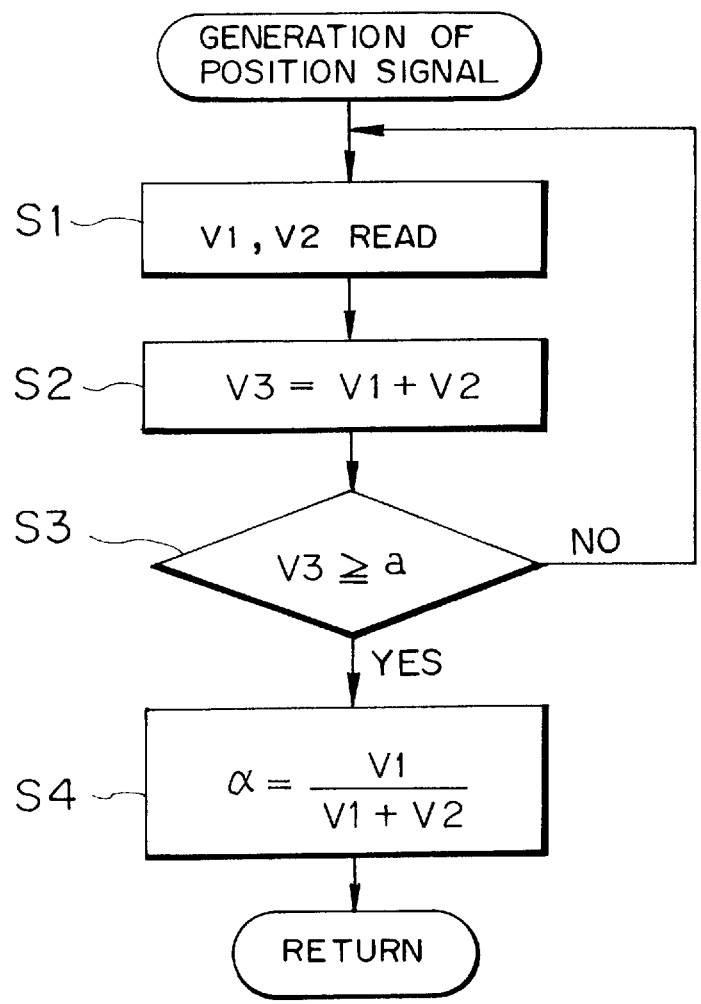
FIG. 27(b) is a flow chart for explanation of a positional signal generation subroutine which is executed by a controller shown in FIG. 27(a).

A controller 24' is obtained by deforming the controller 24 shown in FIG. 11, and the controller 24' obtains a position signal, without using the summing circuit 21 nor the determination circuit 22, on the basis of output voltage from the detection coils 2 and 3. FIG. 27 shows a flow chart showing a subroutine for generating a position signal by using the controller 24'.

When, in the controller 24', the system control shifts from the main routine (not shown) to the subroutine for generation of the position signal, the controller 24' first reads AC voltages generated in the detection coils 2 and 3 as voltage data V1 and V2 respectively (Step 1). Then the read voltage data V1 and V2 are added to each other to obtain a summed-up value V3 (Step S2). Then it is determined whether the summed-up value is not less than a prescribed value "a" or not (Step 3). If it is determined that the summed-up value is smaller than the prescribed value "a", the system control returns to Step S1, where voltage data V1 and V2 are read, and the same routine is repeated until the summed-up value becomes not less than the prescribed value "a". On the other hand, in Step S4, calculation of V1/(V1+V2) is executed to obtain a position signal a, then the subroutine is terminated, and the system control returns to the main routine. It should be noted that also the controller 24' supplies an instruction signal to the energizing circuit 20 at an appropriate timing such as a timing synchronized to an ignition timing of an internal combustion engine or the like, as in the controller 24.

Figure 28A:
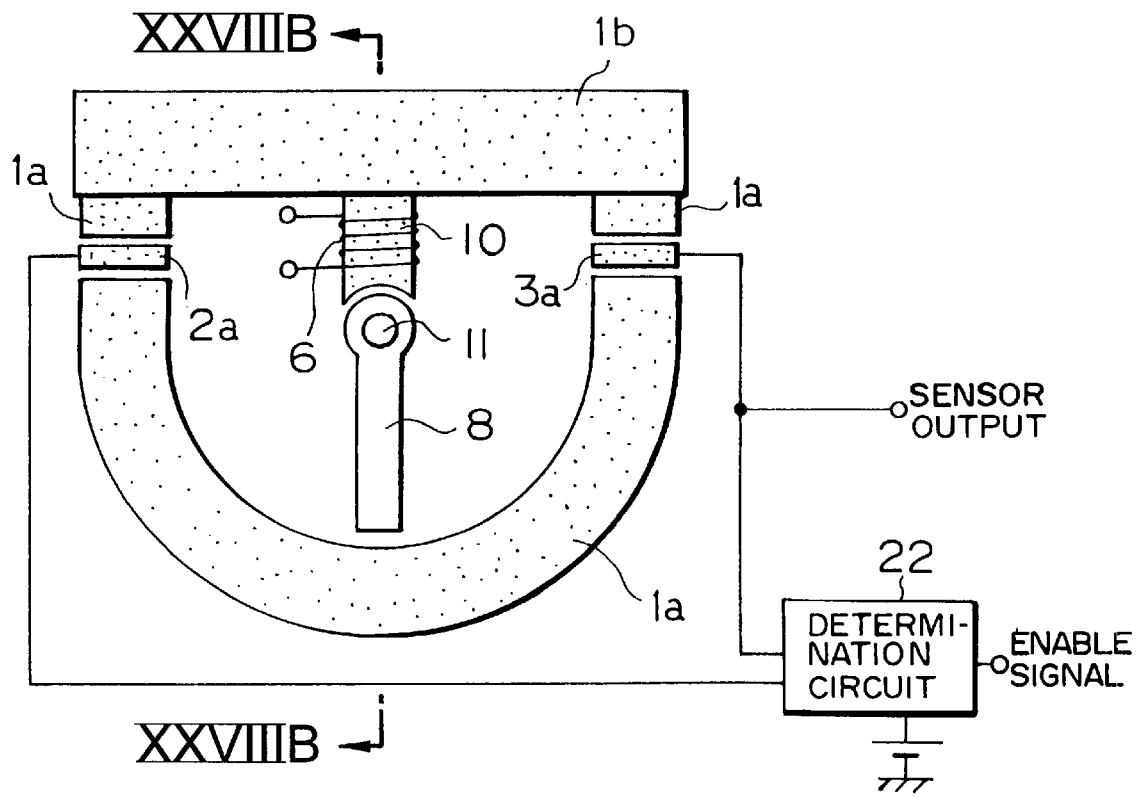
FIGS. 28(a) and 28(b) are cross-sectional views each illustrating construction of the magnetic position sensor according to the present invention.
Figure 28B:
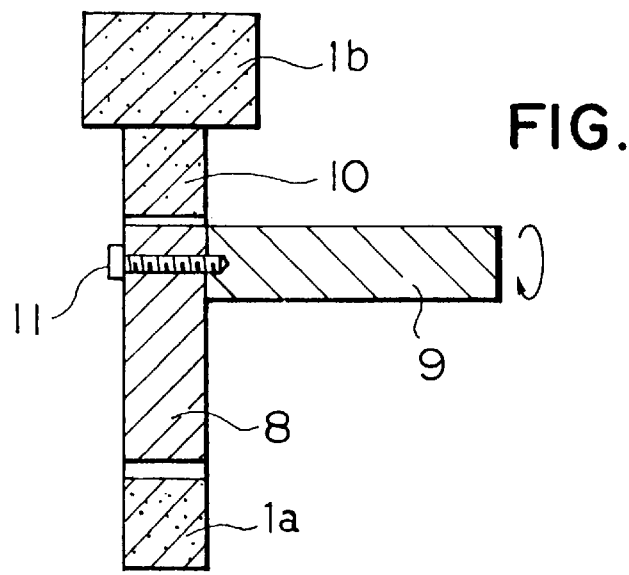

FIGS. 28(*a*), 28(*b*), 29 and 31 show other embodiments of the present invention which can detect angular position or linear position of a movable object to be detected according to the same principle as in the method of generating the position signal by means of the magnetic sensor mentioned above.

FIG. 28(*a*) and FIG. 28(*b*) show a magnetic position sensor the same as the magnetic position sensor shown in FIG. 13 except that Hall elements 2*a* and 3*a* are used in place of the detection coils 2 and 3. It should be noted that the same reference numerals are assigned to the sections corresponding to those of the sensor shown in FIG. 13, and the description thereof is omitted herein.

The magnetic position sensor shown in FIG. 28(*a*) and 28(*b*) has a pair of Hall elements 2*a* and 3*a* located on the circular member 1*a*. In this figure, the energizing coil 6 is driven by an energizing circuit not shown herein, a magnetic flux generated in the fixed magnetic member 1 is detected by the Hall elements 2*a* and 3*a*, and a sensor output signal indicating an angular position of the movable magnetic member 8 can be obtained. The principle of detection is the same as that for the magnetic position sensor shown in FIG. 13, and also the position signal can be obtained in the same way as mentioned above. It is in this instance to be understood that the initial sensor output signal before energization of the coil 6 is a voltage offset caused by the Hall element, and therefore more accurate position data can be obtained by correcting this ossfet voltage in accordance with the initial sensor output voltage.

Figure 29:
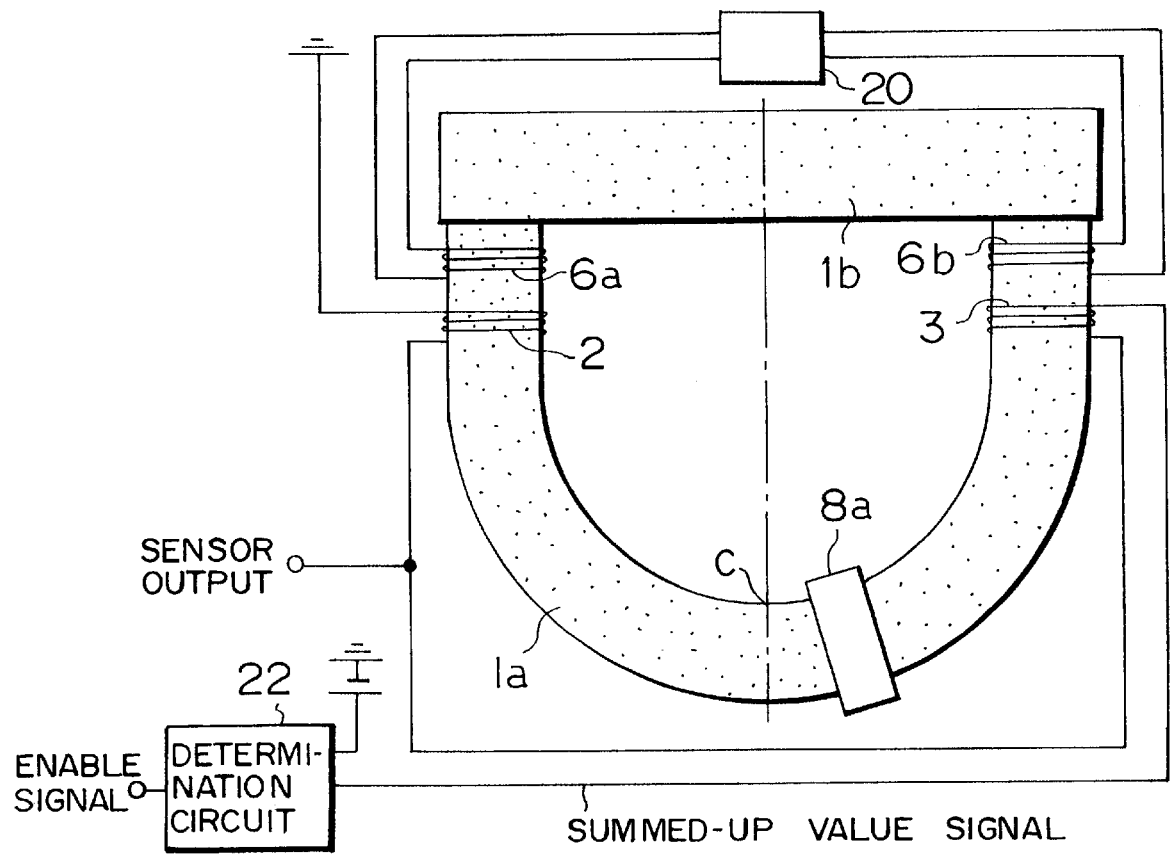
FIG. 29 is a view illustrating a construction of the magnetic position sensor according to the present invention.

The magnetic position sensor shown in FIG. 29 has fixed magnetic members 1*a* and 1*b* forming a circular magnetic path. The magnetic position sensor comprises two detection coils 2 and 3 wound around the fixed magnetic member 1*a* and two energizing coils 6*a* and 6*a*. Furthermore, the magnetic position sensor has a short-circuit coil 8*a* movably mounted on the fixed magnetic member 1*a*. The pair of energizing coils 6*a* and 6*a* are wound around two legs of the member on the arc respectively. The pair of coils 2 and 3 are wound around the member 1*a* on the arc at positions adjoining the energizing coils 6*a* and 6*b*, respectively. The short-circuit coil 8*a* can freely move along the member 1*a* on the arc together with a movable member (not shown) the position of which is detected.

Figure 30:
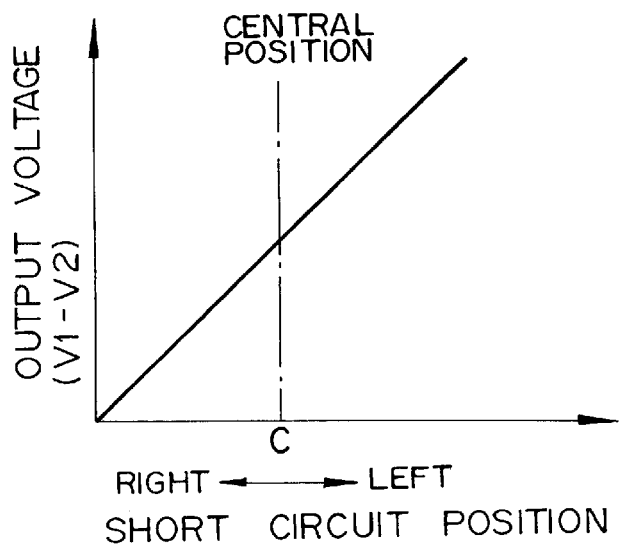
FIG. 30 is a graph illustrating output characteristics of the sensor shown in FIG. 29.

In the magnetic position sensor having such configuration as described above, when the energizing coils 6a and 6b are AC-energized by the energizing circuit 20, electromotive forces are generated in the detection coils 2 and 3 respectively. An electromotive force is also generated in the short-circuit coil 8a and a short-circuit current flows in the coil 8a so as to generate a counter magnetic flux. This counter magnetic flux influences voltages appearing across the detection coils. There is generated a voltage difference between voltages V1 and V2 generated by the detection coils 2 and 3 respectively. Assuming that the detection coils 2 and 3 are differentially wound, when computing a voltage difference (V1−V2) with reference to a central position C of the fixed magnetic member 1a, such linear change as shown in FIG. 30 occurs in terms of the position of the short-circuit coil 8a. Outputs from the detection coils 2 and 3 are added to each other, and the sum is supplied to the determination circuit 22 which is the same as shown in FIG. 11.

Figure 31:
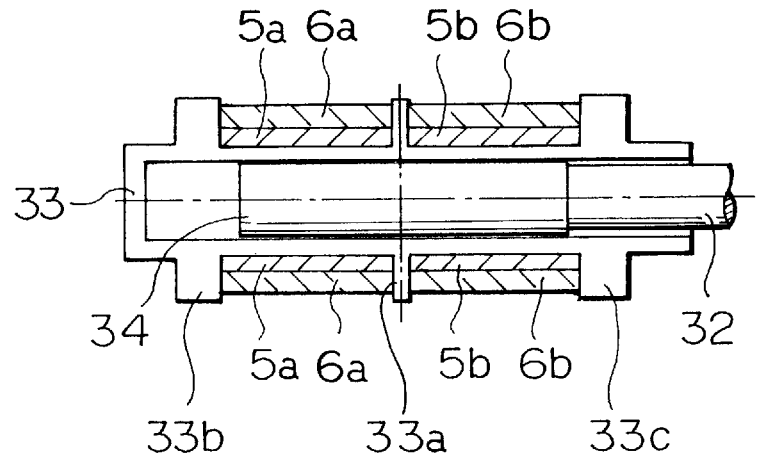
FIG. 31 is a cross-sectional view illustrating construction of the magnetic position sensor according to the present invention.

FIG. 31 shows a cross-sectional view of a magnetic position sensor in which a movable magnetic member moves linearly.

Figure 32:
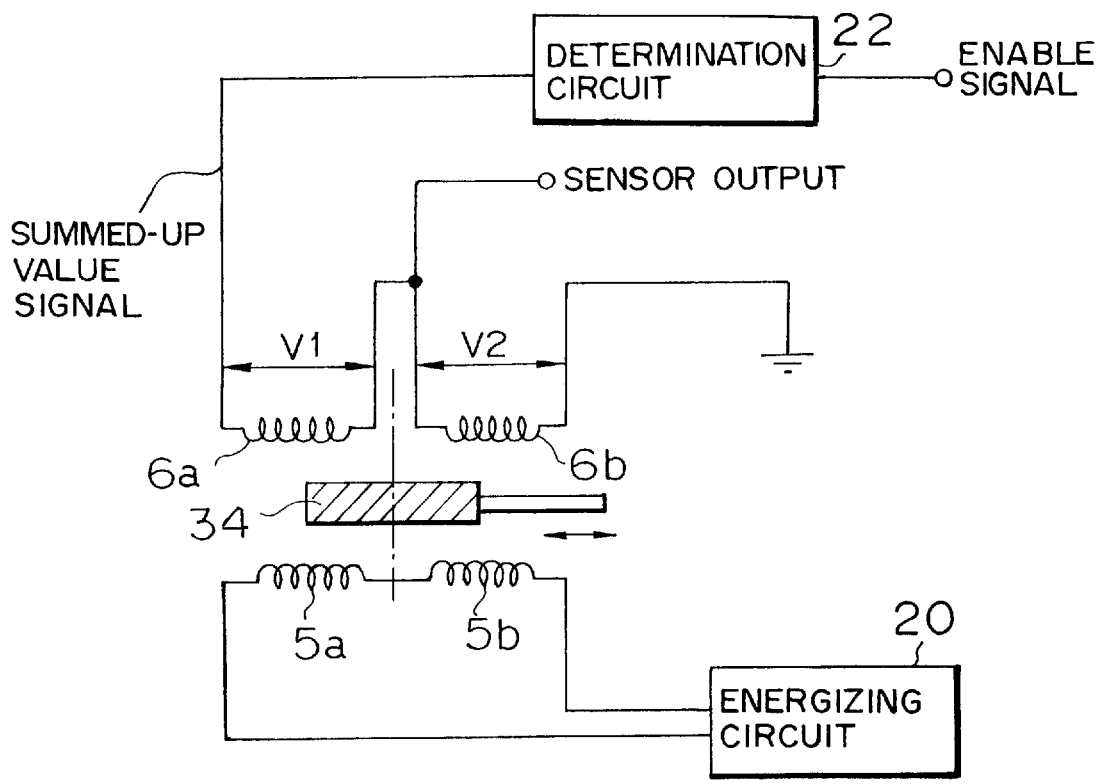
FIG. 32 is a circuit diagram illustrating a circuit electrically equivalent to the sensor shown in FIG. 31.

FIG. 32 shows a position detection circuit inducing the magnetic position sensor shown in FIG. 31. The magnetic position sensor shown in FIG. 31 has a cylindrical bobbin 33, one end of which is opened and the other end of which is closed. The energizing coils 6a and 6b are wound respectively between projecting sections 33a, 33b and between projecting sections 33a, 33c with the projecting section 33a held therebetween. The detection coils 2 and 3 are wound around the energizing coils 6a and 6b. Also a movable member 32 is movably inserted into the bobbin 33 with a core 34 engaging a tip section of the movable member 32, so that the core 34 can freely move together with the bobbin 33 in a hollow space in the axial direction.

The magnetic position sensor having such configuration as described above is based on a principle of a differential transformer. When AC-energized by an energizing circuit not shown herein, the energizing coils 5a and 5b emits, magnetic fluxes, and electromotive forces V1 and V2 are generated in the detection coils 6a and 6b. The electromotive forces V1 and V2 change in magnitude in accordance with a position of the core 34. Herein the position of the core 34, that is, a position of the movable member 32 can be detected as in the case of the magnetic position sensor shown in FIG. 29.

The magnetic position sensor described above obtains linear output characteristics in terms of a position of a body to be detected. However, a switch output corresponding to a position of a body to be detected is obtained in the magnetic position sensor described below.

Figure 33:
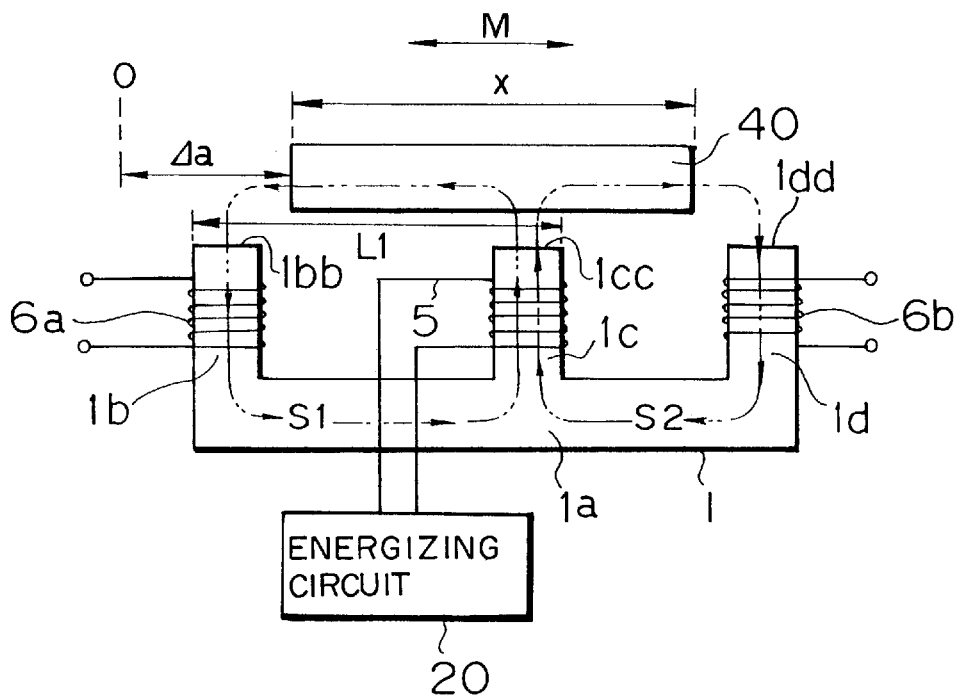
FIG. 33 is a view illustrating a construction of the magnetic position sensor according to the present invention.
Figure 34:
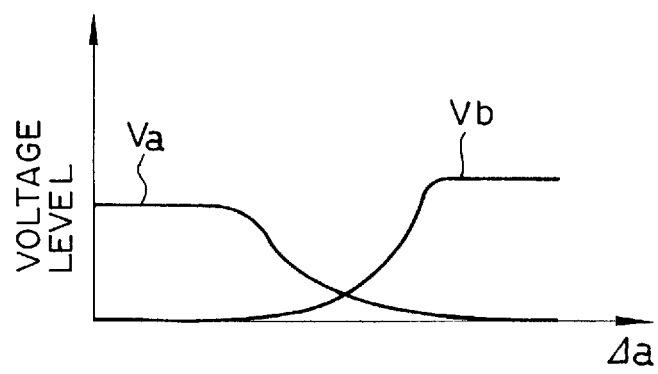
FIG. 34 is a graph illustrating output characteristics of the sensor shown in FIG. 33.

FIG. 33 shows a first embodiment of the magnetic position sensor producing a switch output.

In the magnetic position sensor shown in FIG. 33, at first the fixed magnetic member 1 comprises a longitudinal bottom section and projecting sections 1b through 1d each projecting in the direction perpendicular to the longitudinal direction of the bottom section 1a, and has an E-shaped form. The movable magnetic member 40 is located at a specified space from the free edge faces 1bb to 1dd of the projecting sections 1b to 1d substantially in parallel thereto. The detection coil 6a, energizing coil 5, and detection coil 6b are wound around the projecting section 1b, 1c, and 1d respectively.

In this figure, a gap between the projecting sections 1b and 1c is larger than a gap between the projecting sections 1c and 1d. However, the projections may be located equidistantly and this is a matter of design.

The movable magnetic member 40 is supported by a supporting member (not shown), and can be moved linearly along the longitudinal direction (in the direction indicated by the arrow M) by a driving means (not shown). A length X of the movable magnetic member 40 is larger than a distance L1 between a side face of the projecting section 1b and that of the projecting section 1c.

Next description is made for a principle of operations of the magnetic position detection switch.

At first the energizing coil 5 wound around the projecting section 1c is energized by the energizing circuit 20, and generates a magnetic flux. The magnetic flux enters the movable magnetic member 40, where the magnetic flux branches to two parts, and the branched two magnetic fluxes pass through the projection sections 1b and 1c respectively, and then through the bottom section 1a, and return to the projecting section 1c, thus causing two closed magnetic paths S1 and S2 (shown by alternate long and two short dashes line in the figure). It is to be understood that density of the magnetic fluxes passing through the two closed magnetic paths S1 and S2 changes in accordance with a position of the movable magnetic member 40. For instance, in the figure, if the movable magnetic member moves toward the side of projecting section 1b, the density of the magnetic flux interlinking the detection coil 6a increases, and the density of the magnetic flux interlinking the detection coil 6b decreases in the same proportion. If, on the other hand, the movable magnetic member 40 moves toward the side of projecting section 1d, a phenomenon contrary to that described above occurs. A electromotive force corresponding to a relative position between the movable magnetic member 40 and the fixed magnetic member 1 is generated in the detection coils 6a and 6b.

Herein a relation between a travel Δa from a reference point O of the movable magnetic member 40 and the electromotive forces Va and Vc generated in the coils 6a and 6b respectively is as shown in FIG. 26. Therefore, a state that the movable magnetic member 40 is placed at a prespecified position can be detected by detecting the electromotive forces in the detection coils.

Figure 35:
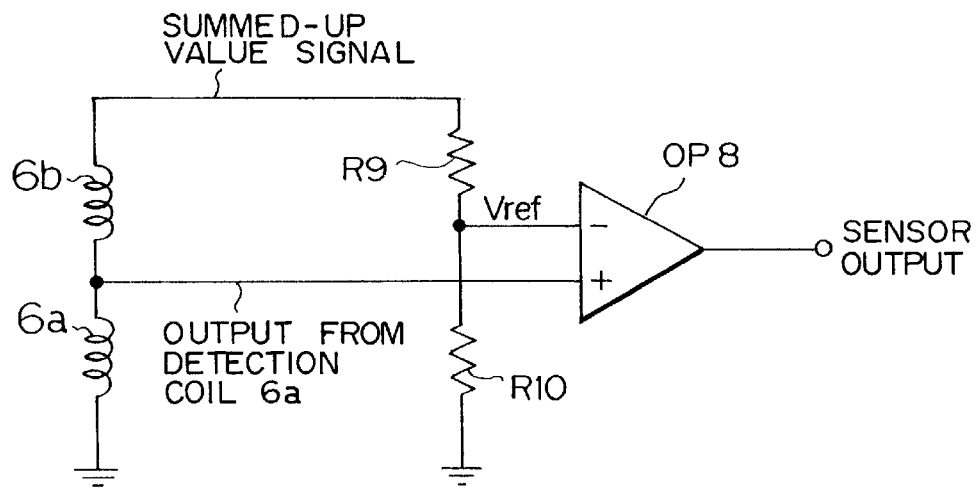
FIG. 35 is an electric circuit diagram illustrating a detection circuit for obtaining a sensor output from the sensor shown in FIG. 33.

FIG. 35 is a detection circuit for obtaining a sensor output from the magnetic position sensor shown in FIG. 33.

When the energizing coil 5 in the magnetic position sensor shown in FIG. 33 is energized, a magnetic flux is generated and electromotive forces are induced in the detection coils 6a and 6b because of the magnetic flux. FIG. 35 shows a detection circuit for obtaining a sensor output on the basis of the electromotive forces.

The detection circuit comprises a comparator OP8 of an operating amplifier, detection coils 6a and 6b connected in series to each other, and resistors R9 and R10 connected in series to each other so as to generate the reference voltage Vref.

Figure 36A:
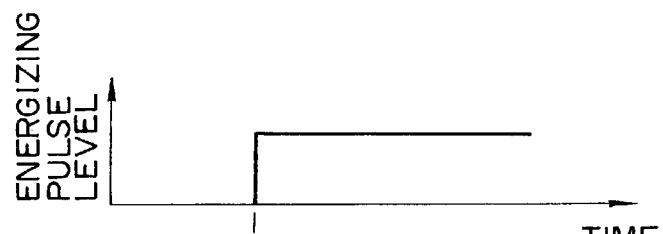
FIGS. 36(A) to 36(D) are wave form charts respectively illustrating signal wave forms in a major section of the circuit of FIG. 35.
Figure 36B:
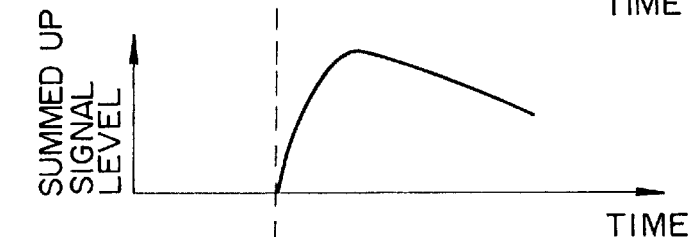
Figure 36C:
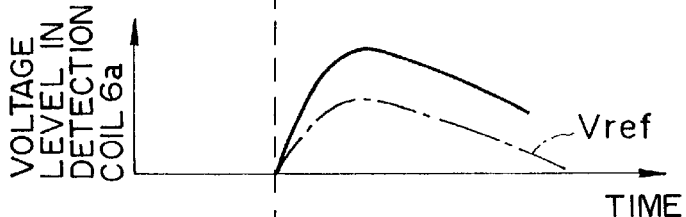
Figure 36D:
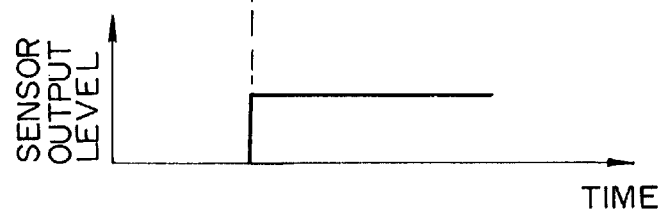

FIG. 36(A)–36(D) and FIG. 37(A)–37(D) are wave from charts respectively illustrating signal wave forms in a major portion of the detection circuit shown in FIG. 35. FIG. 36(D) shows a wave form of an output from the detection coil 6a in the magnetic position sensor shown in FIG. 33 when the movable magnetic member 40 has moved from the position shown in the figure to the side of 1b and reached a position opposing to free edge faces 1bb and 1cc of the projecting sections 1b and 1c.

FIG. 37(A)–37(D) show wave forms in output from the detection coil 3, when the movable magnetic member 40 has moved from a position shown in FIG. 33 to the side of the projecting section 1d and is located at a position opposing to the free edge faces 1cc and 1dd of the projecting sections 1c and 1d.

Figure 37A:
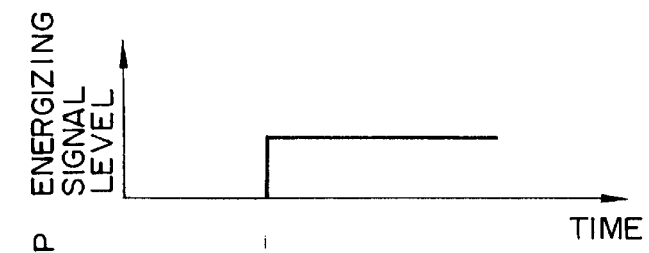
FIGS. 37(A) to 37(D) are diagrams showing waveforms of signals appearing in major portions of the circuit shown in the FIG. 35.
Figure 37B:
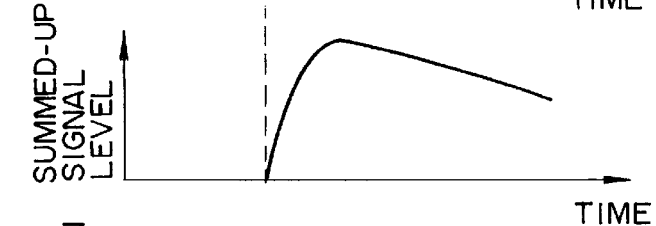
Figure 37C:
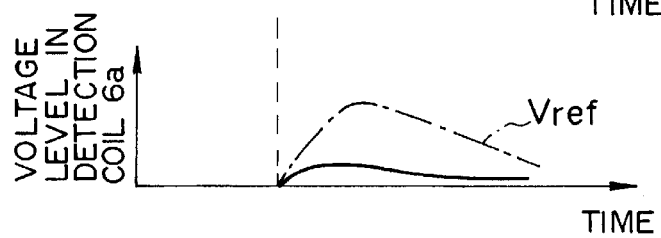
Figure 37D:
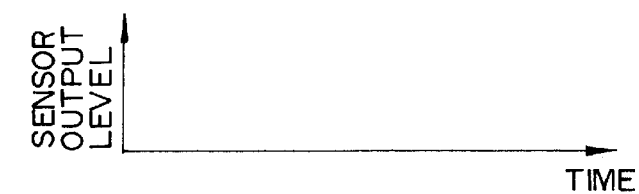

In the detection circuit, when the energizing pulses as respectively shown in FIG. 36(A) and FIG. 37(A) are emitted from the energizing circuit 20, the summed-up value signal and an output voltage from the detection coil 6a as shown in FIG. 36(B), FIG. 36(C) and FIG. 37(B), FIG. 37(C) are generated. An output voltage from the detection coil 6a is supplied to a non-inverse input terminal of the comparator OP8, and the reference voltage Vref obtained by dividing the summed-up value signal obtained by adding voltages generated in the coils 6a and 6b is supplied to the inverse input terminal thereof.

The comparator OP8 generates a logic signal "1" as shown in FIG. 36(D) when the output voltage from the detection coil 6a is not less than the reference voltage Vref.

It should be noted that, with the detection circuit having the configuration as described above, even if amplitude of the energizing pulse energizing the energizing coil 20 fluctuates, the sensor output is hardly affected by the fluctuation. If, for instance, the energizing pulse becomes smaller, a decreasing ratio of an output voltage from the coil 6a become equal to that of the summed-up value obtained by summing the output voltages from the detection coils 6a and 6b, so that a detection error does not occur in the sensor output.

Figure 38:
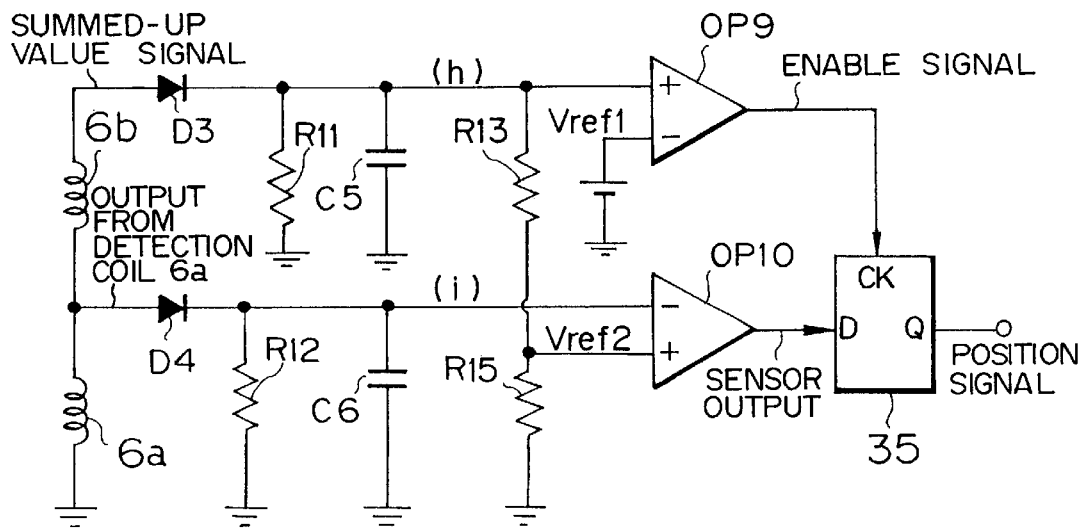
FIG. 38 is a circuit diagram illustrating a position signal generating circuit combined with the sensor shown in FIG. 33 for obtaining a position signal.

Next description is made for a position detecting circuit combined with the magnetic position sensor shown in FIG. 33 for obtaining a position signal. When the energizing coil 20 of the magnetic position sensor shown in FIG. 33 is energized, a magnetic flux is generated, and electromotive forces is induced in the detection coils 6a and 6b, respectively. FIG. 38 shows an electric circuit for obtaining a position signal on the basis of the electromotive forces.

The position detecting circuit shown in the figure comprises the detection coils 6a, 6b connected in series to each other, diodes D3, D4, resistors 11 through 13, capacitors C5, C6, comparators OP9, OP10 each comprising an operating amplifier, and type D flip-flop 35.

Furthermore, FIG. 39 especially shows a wave form when the movable magnetic member 40 shown in FIG. 33 has moved from a position shown in the figure to the side of projecting section 1b and is located at a position opposing the free edge faces 1bb and 1cc of the projecting sections 1b and 1c, that is, when a closed magnetic path interlinking the projection coil 6a has been formed.

Then, description is made for basic operations of the position signal generating circuit shown in FIG. 38 with reference to FIG. 39(A)–39(H).

Figure 39A:
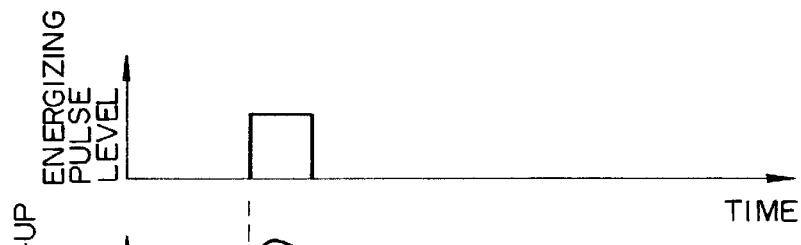
FIGS. 39(A) to 39(H) are wave form charts respectively illustrating signal wave forms in a major section of the circuit of FIG. 38.

At first, when the energizing pulse as shown in FIG. 39(A) is generated from the energizing circuit 20, electromotive forces are generated in the coils 6a and 6b. In the detection coil 6a, for instance an output voltage as shown in FIG. 39(C) is generated. The output voltage from the detection coil 6a is rectified by the diode D4, and is converted to a signal (i) as shown in FIG. 39(E) via a filter comprising a resistance R12 and a capacitor C6, and the signal (i) is inputted in the common phase input terminal of the comparator OP10.

Figure 39B:
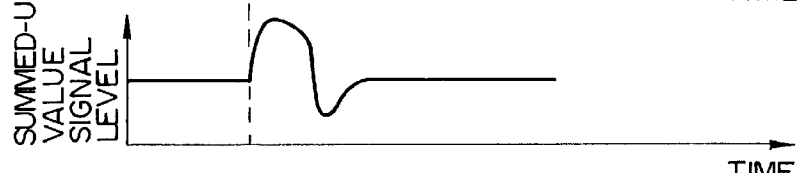
Figure 39C:
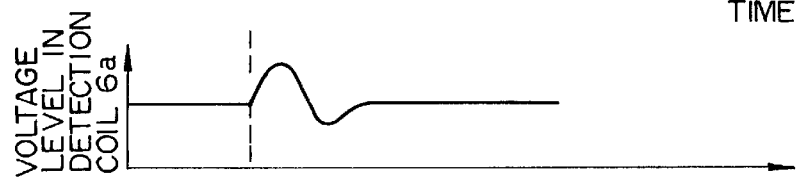
Figure 39D:
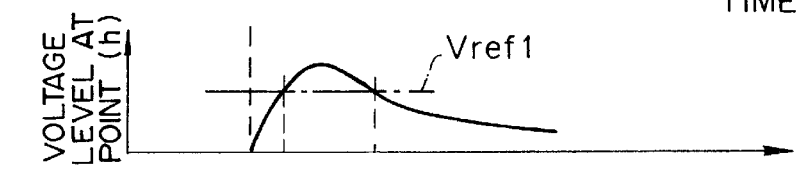
Figure 39E:
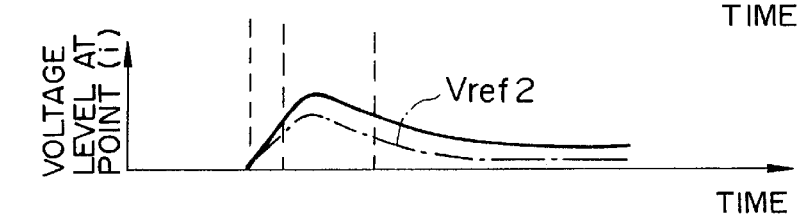

On the other hand, the summed-up value signal having such a waveform, as shown in FIG. 39(B), obtained by summing output voltages from the detection coils 6a and 6b, is rectified by the diode D3, and then converted to the signal (h) as shown in FIG. 39(D) via a filter including a resistor R11 and a capacitor C5, and one of the signals above is supplied to a non-inverse input terminal of the comparator OP9, and the other signal is divided by resistors R13 and R15 and converted to the reference voltage Vref 2, which is inputted into a inverse input terminal of the comparator OP10.

The comparator OP 10 generates a sensor signal, which is logical value "1" when the input voltage (i) is more than the reference voltage Vref2, and the sensor output is supplied to a D terminal of a D type flip 35.

Figure 39F:
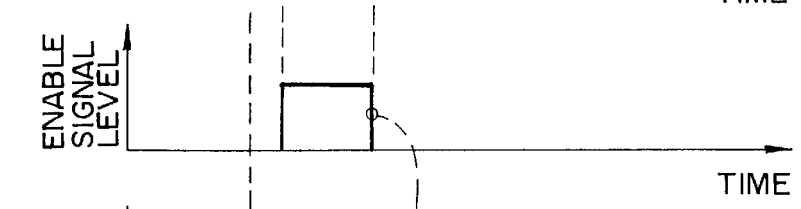
Figure 39G:
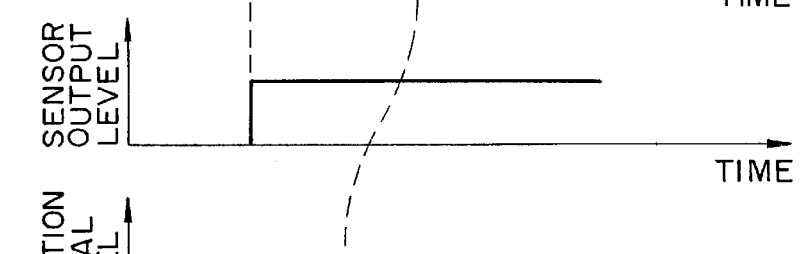

When, on the other hand, the signal (h) has a level more than the reference voltage Vref1, the comparator 9 generates the logical value "1" as shown in FIG. 39(F) as an enable signal, and the enable signal is supplied to a Ck terminal of the D type flip-flop 35.

Figure 39H:
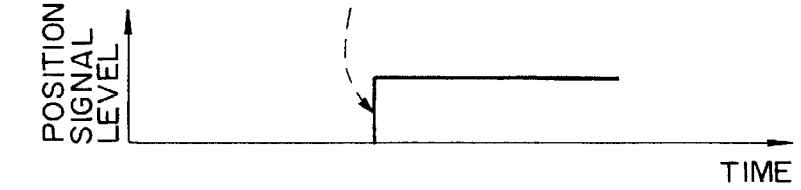

The D type flip-flop 35 latches a logical value of the sensor output at the trailing edge of the enable signal and holds the latched signal which is a position signal as shown in FIG. 39(H) from the Q terminal, and holds the position signal.

When a magnetic position sensor is so used as to obtain a switch output from a preselected detection coil, it is necessary only to check an output of the particular detection coil, so that the configuration is allowable where an enable signal is generated only when an output from the particular detection coil is higher than a specified level. In such case as described above, such configuration is not required that produces an enable signal when a sum of outputs from two or more detection coils is more than a specified level.

Figure 40:
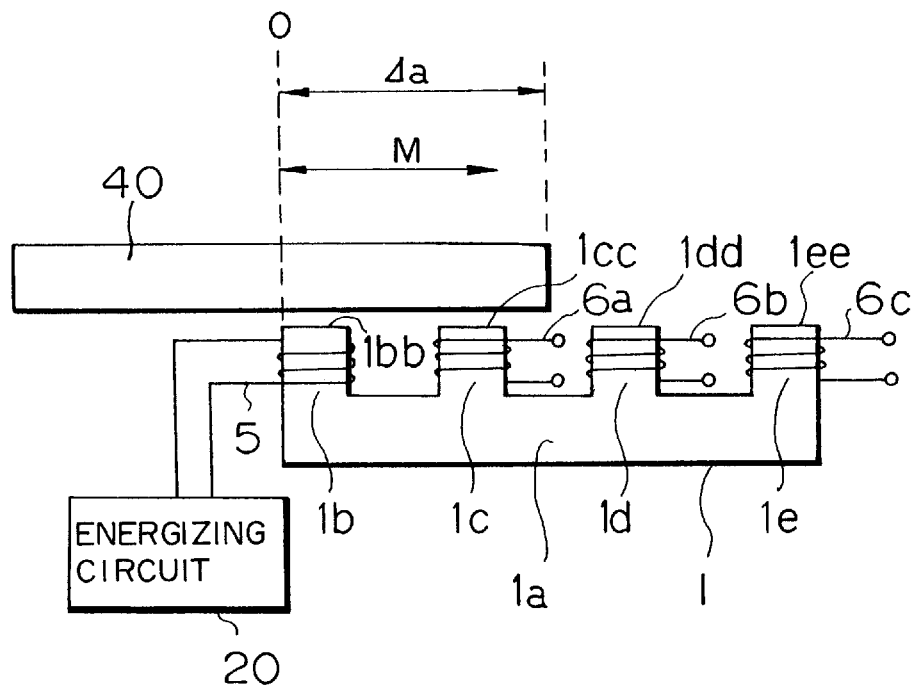
FIG. 40 is a view for illustrating a construction of the magnetic position sensor according to the present invention.

FIG. 40 shows a second embodiment of a magnetic position sensor which produces a switch output.

In this figure, the same reference numerals are assigned to the same sections as corresponding sections in the magnetic position sensor shown in FIG. 33, and description thereof is omitted herein.

In the magnetic position sensor shown in FIG. 40, the fixed magnetic member 1 has a bottom section 1a extending in the longitudinal direction, and projecting sections 1b to 1e provided equidistantly in a direction perpendicular to the bottom section 1a. The movable magnetic member 40 is located oppositely to, the free edge faces 1bb to 1ee of the projecting sections 1b to 1e and substantially in parallel thereto. The energizing coil 5 and detection coils 6a to 6c are wound around the projecting sections 1b to 1e respectively.

The movable magnetic member 40 is supported by a supporting body not shown herein, and can be moved linearly in the longitudinal direction (in a direction indicated by the arrow M) by a specified driving means not shown herein. A length of the movable magnetic member 40 is substantially equal to that of the bottom section 1a.

Next description is made for a principle of detection by the magnetic position sensor as described above.

When the energizing coil 5 wound around the projecting section 1b is energized by the energizing circuit 20, it generates a magnetic flux. The magnetic flux enters the movable magnetic member 40, passes through the projecting section 1c, then passes through the bottom section 1a, and returns to the projecting section 1b, thereby forming a closed magnetic path and generating an electromotive force in the coil 6a.

When the movable magnetic member 40 has moved from the position shown in the figure to the side of the projecting section 1d and faces also to the free edge face of the projecting section 1d, a magnetic flux generated from the coil 5 branches to two parts in the movable magnetic member 40, and one of the two branched magnetic fluxes enters the projecting section 1c, the other one enters the projecting section 1d, and both the magnetic fluxes return to the projecting section 1b, thereby forming two closed magnetic paths and generating with electromotive forces in the coils 6a and 6b.

When, furthermore, the movable magnetic member 40 has moved to the side of projecting section 1e and also faces an edge face of the projecting section 1e, three closed magnetic paths are formed and electromotive forces are generated in the detection coils 6a, 6b, and 6c respectively.

Figure 41A:
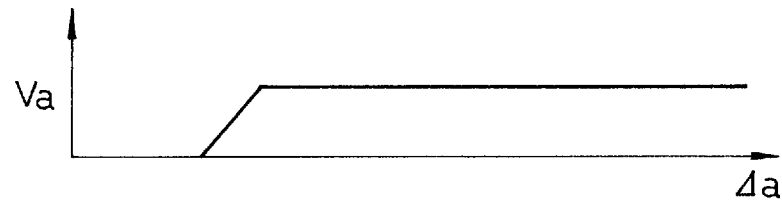
FIGS. 41(A) to 41(C) are graphs respectively showing output characteristics of the sensor shown in FIG. 40.
Figure 41B:
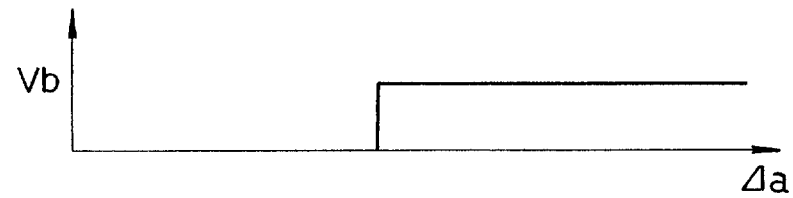
Figure 41C:
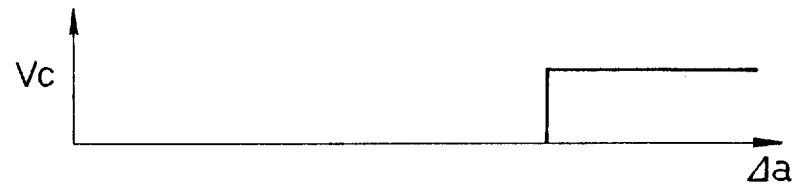

Herein the relation between a travel Δa from a given reference point O of the movable magnetic member 40 and the electromotive forces Va to Vc generated in the coils 6a through 6c respectively are as shown in FIG. 41(A) through 41(C), and a position of the movable magnetic member 40 can be detected on the basis of electromotive forces appearing across the detection coils.

Figure 42:
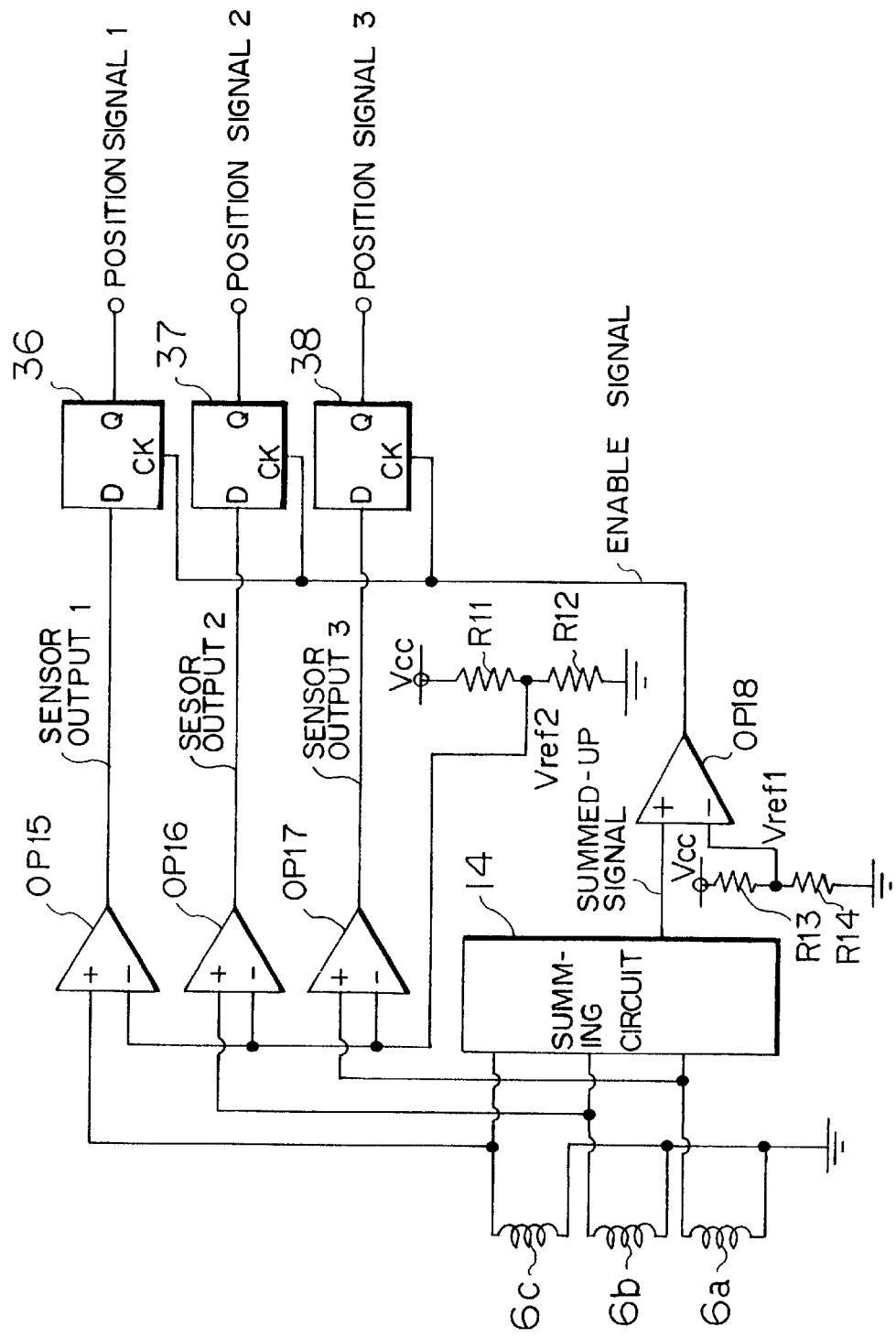
FIG. 42 is a circuit diagram illustrating a position signal generating circuit combined with the sensor shown in FIG. 40 for obtaining a position signal.

FIG. 42 shows an embodiment of a position signal generating circuit combined with the magnetic position sensor shown in FIG. 40 for producing a position signal. When the energizing coil 5 in the magnetic position sensor shown in FIG. 42 is energized, a magnetic flux is generated, and an electromotive force is induced by the magnetic flux which interlinks the detection coil. FIG. 42 shows a positional signal generating circuit which produces a position signal on the basis of the electromotive forces described above.

The position signal generating circuit shown in FIG. 42 comprises a summing circuit 21, comparator OP15 to OP18 each comprising an operating amplifier, D type flip-flops 36 to 38, resistors R11 to 14, and a constant voltage supply unit Vcc.

In this position signal generating circuit, voltages generated in the detection coils 6a to 6c are supplied to the summing circuit 21 respectively. The summing circuit 21 supplies a summed-up value signal obtained through summation of these voltages to a non-inverse input terminal of the comparator OP18. The reference voltage Vref1 is applied to an inverse input terminal of the comparator OP18. When the summed-up value signal is more than the reference value level Vref 1, the comparator OPl8 supplies a logical value signal "1" as an enable signal to a CK terminal of each of the D type flip-flops 36 to 38.

On the other hand, voltages generated in the detection coils 6a through 6b are supplied to non-inverse input terminals of the comparators OP15 through OP17 respectively, while the reference voltage Vref2 is supplied to an inverse input terminal thereof. When any input voltage is more than the reference voltage Vref2, the corresponding one of comparators OP15 to OP17 generates a logical value "1" as either of sensor outputs 1 to 3, and supplies it to a D terminal of the D type flip-flops 37 to 37. The D type flip-flops 36 to 38 latch logical values for the sensor outputs 1 to 3, and outputs the latched signals, either of position signals 1 to 3 from the Q terminal respectively.

Figure 43:
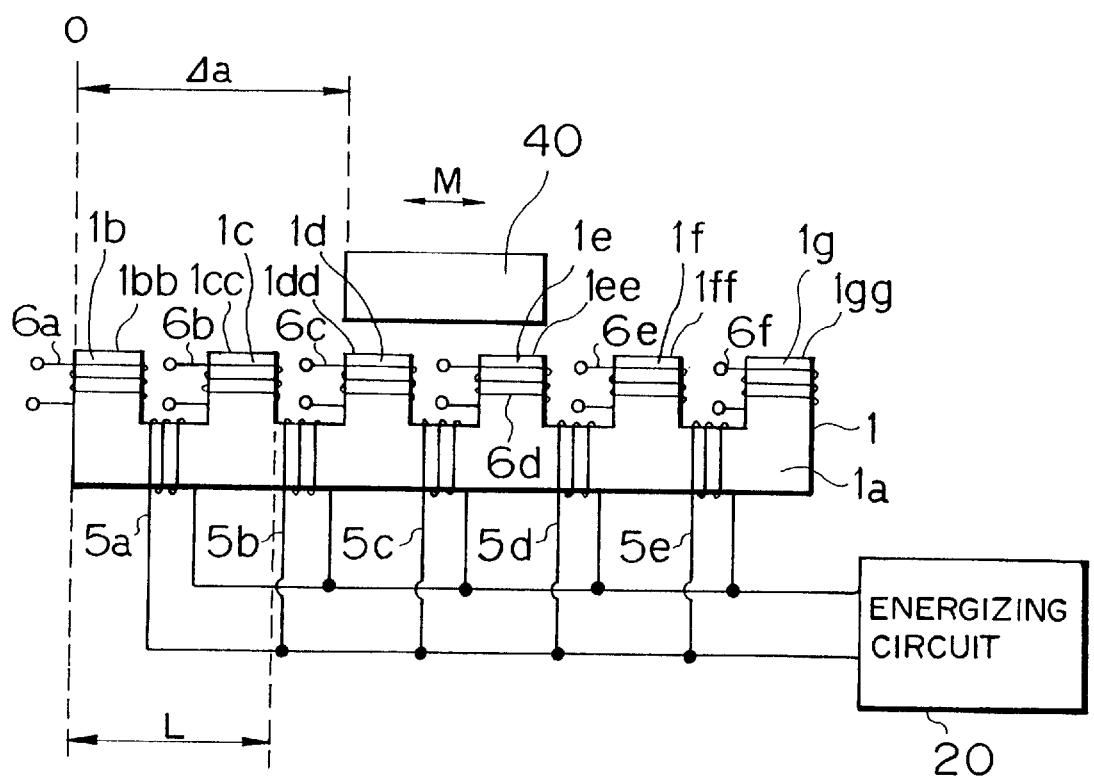
FIG. 43 is a view illustrating a construction of the magnetic position sensor according to the present invention.

FIG. 43 shows a third embodiment of the magnetic position sensor for producing one or more switch outputs.

In FIG. 43, the same reference numerals are assigned to the same sections as corresponding sections in the magnetic position sensor shown in FIG. 33, and description thereof is omitted herein.

The magnetic position sensor shown in FIG. 43 comprises a bottom section 1a extending in the longitudinal direction, a fixed magnetic member 1 comprising projecting sections 1b to 1g located equidistantly from each other and projecting in a direction perpendicular to the bottom section 1a, a movable magnetic member 40 confronting edge faces 1bb to 1gg of the projecting sections 1b to 1d and substantially in parallel thereto, coils 6a to 6f wound around the projecting sections 1b to 1g, and coils 5a to 5e wound around the adjoining projecting sections of the bottom section 1a.

The movable magnetic member 40 is supported by a supporting member not shown herein, and can be reciprocally moved by a driving means not shown herein in the longitudinal direction (in a direction indicated by the arrow M).

A length of the movable magnetic member 40 is equal to a distance L between side faces of adjoining projecting sections.

It should be noted that, although the length of the movable magnetic member 40 is equal to the distance L in the embodiment described above, the length of the movable magnetic member 40 may be more than the distance L.

In this figure, the coils 5a to 5e are energized by the energizing pulses generated by the energizing circuit 20, so as to generate magnetic fluxes respectively. The magnetic fluxes form a closed magnetic loop with the movable magnetic member 40 and two projecting section opposing the movable magnetic member 40 at its free edge face, and electromotive forces are generated in two coils wound around the two projecting sections.

The coils 5a to 5e are energized by the energizing pulses generated from the energizing circuit 20, so as to generate magnetic fluxes. In this figure, the magnetic flux generated by the energizing coil 5a passes through the projecting section 1d and the movable magnetic member 40, enters the projecting section 1e, and returns to the energizing coil 5c, whereby one closed magnetic path is formed with electromotive forces being generated in the detection coils 6c and 6d. A closed magnetic path is formed between adjoining projecting sections in accordance with a travel of the movable magnetic member, and electromotive forces generated in a pair of coils wound around the projecting sections, so that a position of the movable member 40 can be detected on the basis of the electromotive forces.

The relation between a travel Δa from the reference position O of the movable magnetic member 40 and electromotive forces generated in the coils 6a to 6f respectively can be seen from FIG. 44(A) to FIG. 44(F). It is apparent that a position of the movable magnetic member 40 can be detected on the basis of the electromotive forces in the detection coils 6a to 6f.

Figure 45:
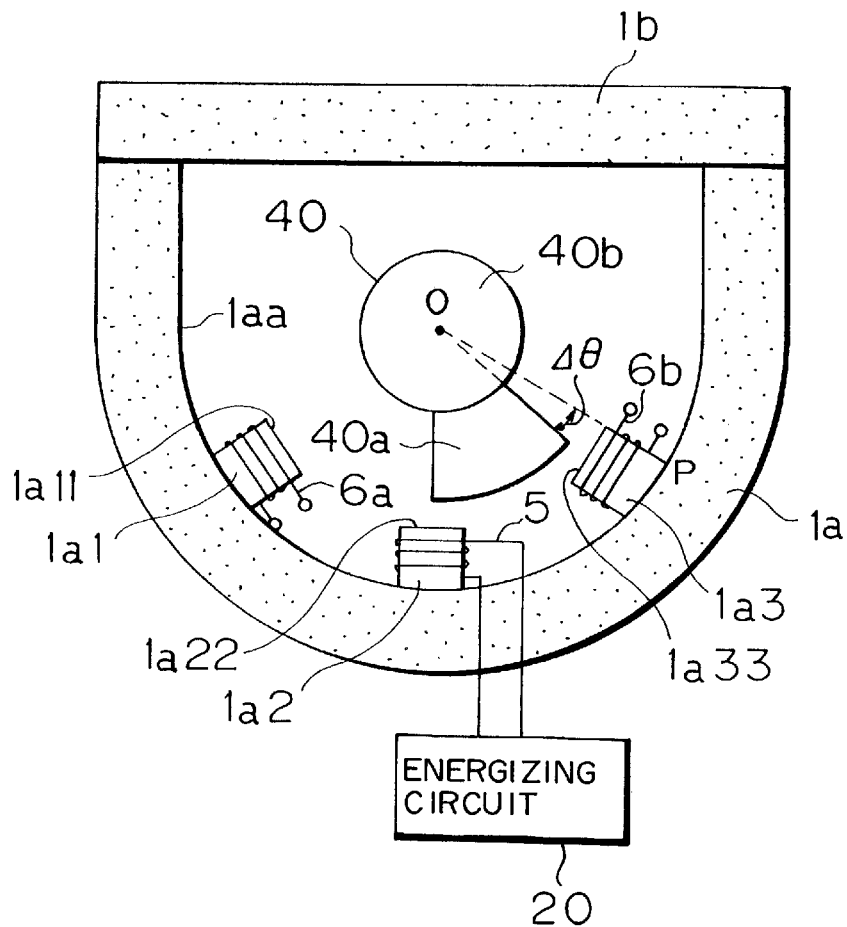
FIG. 45 is a view illustrating a construction of the magnetic sensor according to the present invention.

FIG. 45 shows a fourth embodiment of a magnetic position sensor which produces one or more switch outputs.

The sensor shown in FIG. 45 is used to detect an angular position of a rotatable body.

The magnetic position sensor shown in FIG. 45 comprises a fixed magnetic member 1, a movable magnetic member 40, detection coils 6a, 6b, and energizing coil 5. The fixed magnetic member 1 comprises a U-shaped fixed magnetic member 1a including a semi-circular portion, a rod-shaped member 1b bridging across two legs of the fixed magnetic member 1a, and projecting sections 1a1 1a2, 1a3 respectively projecting from the peripheral internal surface 1aa of the fixed magnetic member 1a. The circular member 1a and the rod-shaped member 1b form a circular arrangement, and the projecting sections 1a1, 1a2, and 1a3 are provided within this circular arrangement.

A radius of rotation of the movable magnetic member 40 is set to a smaller value than a radius of curvature of the circular member 1a, and the center of the curvature coincides with the center of rotation.

The movable magnetic member 40 is located within the circle described above, and comprises a circular-section member 40b and a fan-shaped member 40a fixed to the circular-section member 40b. The circular-section member 40b is connected to a rotating shaft by means of a coupling means such as a screw not shown herein, while the movable magnetic member 40 is carried by a rotating shaft not shown herein, and an edge face of the fan-shaped member 40a in the radial direction makes a rotating movement along the peripheral internal wall 1aa of the circular member 1a, without contacting free edge faces 1a11 to 1a33 of the projecting section 1a1 through 1a3.

A pair of detection coils 6a and 6b are wound around the projecting sections 1a1 and 1a3, while the energizing coil 5 is wound around the projecting section 1a2.

Figure 46A:
FIG. 46(A) and FIG. 46(B) are graphs respectively showing output characteristics of the sensor shown in FIG. 45.
Figure 46B:
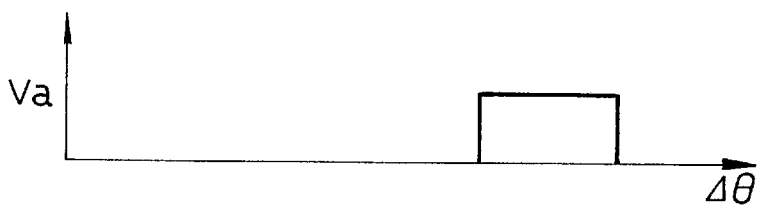

When, with the magnetic position sensor having such configuration as described above, the energizing coil 5 is energized by the energizing circuit 20, generated from the coil 5 produces a magnetic flux which passes through the fan-shaped member 40a, enters the circular members 1a via the projecting section 1a3, and returns to the coil 5, whereby one closed magnetic path is formed with an electromotive force being generated in the coil 6b. A magnetic path may be formed or may not be formed in accordance with the angular position of the movable member 40b. The relation is shown in FIG. 46, the relation being between an angle formed by the line OP linking a center of rotation of the movable magnetic member 40 and one side face of the projecting section 1a3 and the fan-shaped member 40, i.e. an angular position Δθ and electromotive forces Va and Vb generated in the detection coils 6a and 6b respectively. When the movable magnetic member 40 is at a specific angular position, an electromotive force is generated in either one of the detection coils 6a and 6b. Because of this arrangement, such state that the movable magnetic member 40 stays at a specified position can be detected on the basis of an electromotive force generated in either one of the detection coils 6a and 6a.

Figure 47:
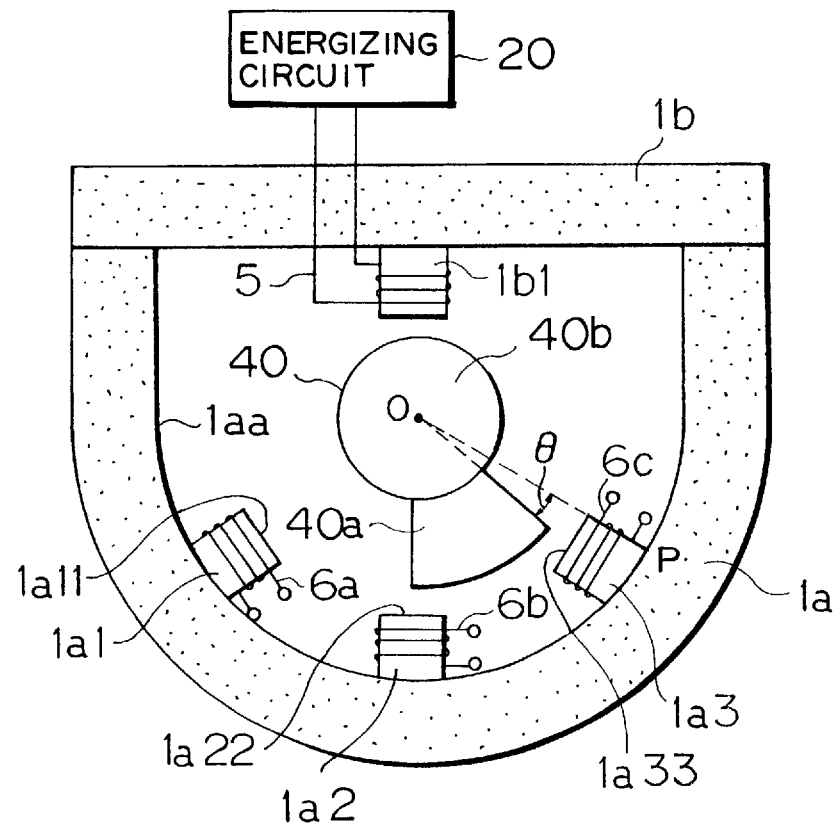
FIG. 47 is a view illustrating a construction of the magnetic position sensor according to the present invention.

FIG. 47 shows a fifth embodiment of the magnetic position sensor which produces switch outputs.

The sensor shown in FIG. 47 is used for detecting an angular position of a rotating body.

In the magnetic position sensor shown in FIG. 47, the fixed magnetic member 1 comprises a U-shaped fixed magnetic member 1a including a semi-circular section, a rod-shaped member 1b bridged between two legs of the fixed magnetic member 1a, projecting sections 1a1, 1a2, 1a3 projecting from the peripheral internal wall of the circular member 1a, and a projecting section 1b1 projecting from the rod-shaped member 1b. The fixed magnetic member 1a and rod-shaped 1b form a circular arrangement, and the projecting sections 1a1, 1a2, 1a3, 1b1 are provided within the circular arrangement.

On the other hand, the movable magnetic member 40 is located within the circular arrangement described above, and comprises a member 40b and a fan-shaped member 40a fixed to the circularly-sectioned member 40b. The member 40b is connected to a rotating shaft not shown herein by means of a coupling means such as a screw not shown herein, while the movable magnetic member 40 is carried by a rotating shaft not shown herein, and an edge face of the fan-shaped member 40a in the radial direction makes a rotational movement along the opposing wall 1aa of the circular member 1a, without contacting free edge faces of the projecting sections 1a1 to 1a3. And, a center of curvature of the circular member 1a coincides with a center O of the rotation. In addition, the detection coils 6a to 6c are wound around the projecting sections 1a1 to 1a3, while the energizing coil 5 is wound around the projecting section 1b1.

With the magnetic position sensor having such configuration as described above, in the figure, when the energizing coil 5 is energized by the energizing circuit 20, a magnetic flux generated from the energizing coil 5 passes through the member 40b and fan-shaped member 40a, where the magnetic flux branches to two parts, one of the branched magnetic fluxes passes through the projecting section 1a3, enters the circular member 1a, passes through the rod-shaped member 1b, and returns to the coil 5, while the other magnetic flux passes through the projecting section 1a2, enters the circular member 1a, passes through the rod-shaped member 1b, and returns to the coil 5, whereby two closed magnetic paths are formed with electromotive forces generated in the detection coils 1a3 and 1a2 respectively.

Figure 48A:
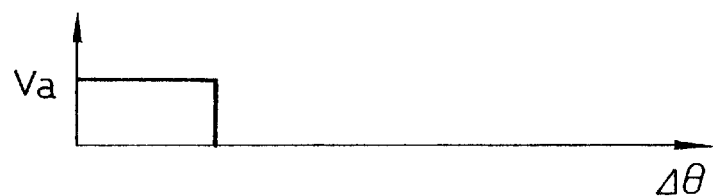
FIGS. 48(A) to 48(C) are graphs respectively showing output characteristics of the sensor shown in FIG. 47.
Figure 48B:
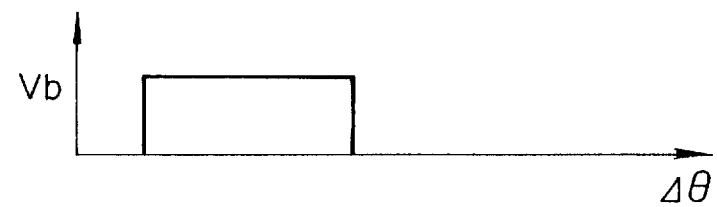
Figure 48C:
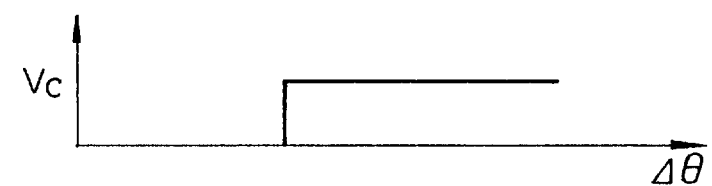

FIG. 48 shows a relation between a angle formed by the line OP linking a center O of rotation of the movable magnetic member 40 to one of the side faces of the projecting section 1a3 and the fan-shaped member 40a, that is, a rotational angle Δθ and electromotive forces in the detection coils 6a to 6c. For this reason, a position of the movable magnetic member 40 can be detected on the basis of the an electromotive forces Va through Vc in the detection coils 6a, 6b, and 6c.

What is claimed is:

1. A magnetic position sensor comprising:
   at least one energizing coil;
   at least two magnetism detecting elements;
   a magnetic path forming means for allowing a magnetic flux interlinking with said energizing coil to pass through said magnetism detecting elements said magnetic path forming means providing a magnetic reluctance corresponding to a current position of a movable member to be detected;
   energizing means for energizing said energizing coil; and
   a position signal generating means for generating a position signal indicating a current position of said movable member in accordance with the respective output signals issued from said magnetism detecting element, wherein said position signal generating means produces said position signal which is based on a ratio between an added value of said output signals and one of said output signals.

2. The magnetic position sensor according to claim 1, wherein said energizing means energizes said energizing coil by a pulsating electric power.

3. The magnetic position sensor according to claim 2, wherein said energizing means includes a monostable multi-vibrator transmitting an energizing pulse in response to an instruction signal.

4. The magnetic position sensor according to claim 2, wherein said energizing means includes an astable multi-vibrator successively generating energizing pulses.

5. The magnetic position sensor according to any one of claim 1, wherein said detecting elements are Hall elements.

6. The magnetic position sensor according to claim 1, wherein said magnetic path forming means comprises a fixed magnetic member around which said energizing coil is wound and a movable magnetic member relatively movable against at least a portion of said fixed magnetic member without contacting thereto and forming at least one closed magnetic path together with said fixed magnetic member, and each of said magnetism detecting elements generate an output signal corresponding to a magnetic flux density in said closed magnetic path.

7. The magnetic position sensor according to claim 6, wherein said fixed magnetic member comprises an annular member forming a semi-circular section, and a rod-like member with one end thereof fixed to said annular member;
   said movable magnetic member can freely rotate around the central axis for rotation position in close proximity of the other end of said rod-like member;

said semi-circular section extends along a rotational locus through a prespecified movable range of said movable magnetic member;

said magnetism detecting elements are located at positions sandwitching therebetween the prespecified movable range of said movable magnetic member;

and said energizing coil is wound around said rod-like member.

8. The magnetic position sensor according to claim 6, wherein said fixed magnetic member has at least three projection sections projected along a moving path of said movable magnetic member, and said magnetism detecting elements and said energizing coil are located on said projections respectively.

9. The magnetic position sensor according to claim 6, wherein said fixed magnetic member includes a bottom section extending in the longitudinal direction and at least three projections each projecting in a direction perpendicular to said bottom section;

said movable magnetic member is provided in substantially parallel to free edge faces of said at least three projections and can move in said longitudinal direction;

said magnetism detecting elements are located on at least two of said projections respectively; and said energizing coil is wound around and located on the remaining one of said three projections.

10. The magnetic position sensor according to claim 8, wherein said movable magnetic member can freely rotate and said fixed magnetic member extends along a circle with a rotational moving locus of the tip of said movable magnetic member, and said tip of said movable magnetic member has the circumferential length corresponding to the distance between said projections.

11. The magnetic position sensor according to claim 1, wherein said magnetic path forming means includes a cylinder on which said energizing coil and said detection coil are wound, and a movable core inserted and provided in the hollow section of said cylinder so that the core can freely move in the axial direction of said cylinder and movable correspondingly to said movable member.

12. The magnetic position sensor according to claim 1, wherein said magnetic path forming means includes a first magnetic path forming means for forming at least one fist closed magnetic path and a second magnetic path forming means for forming a branched magnetic path which can move through a prespecified range relatively to said first magnetic path forming means without contacting thereto so as to split said first closed magnetic path into two closed magnetic paths;

and which further comprises: first and second coils each interlinking with said first closed magnetic path at positions sandwitching said specified range therebetween; and a third coil interlinking with said branched magnetic path, one of said first, second and third coils acting as an energizing coil and the remaining two acting as said detection coils respectively.

13. The magnetic position sensor according to claim 12, wherein said first magnetic path forming means includes a fixed magnetic member forming at least a pair of opposing portions positioned opposedly to each other, and said second magnetic path forming means includes a movable branched magnetic member which can move relatively to at least one of said opposing portions in a space sandwitched between said opposing portions.

14. The magnetic position sensor according to claim 13, wherein said second magnetic path forming means includes an auxiliary branched magnetic member extending in parallel with one of said opposed portions, and a fixed branched magnetic member with one end thereof fixed to said one of said opposed portions and with the other end thereof fixed to said auxiliary branched magnetic member, and said movable branched magnetic member can translate between the one of said opposed portions and said auxiliary branched magnetic member.

15. The magnetic position sensor according to claim 13, wherein said second magnetic path forming means further includes a fixed branched magnetic member with one end thereof fixed to one of said opposed portions, and said movable branched magnetic member can freely rotate around the central axis for rotation positioned in close proximity of the other end of said fixed branched magnetic member and the other of said opposed portions extends along a movable locus of the tip of said movable branched magnetic member.

16. The magnetic position sensor according to claim 14 or claim 15, wherein said energizing coil is wound around said fixed branched magnetic member.

17. The magnetic position sensor according to claim 1, wherein said position signal generating means controls energizing current flowing through said energizing coil at a constant level according to an added value of said output signals.

18. The magnetic position sensor according to claim 17, wherein said position signal generating means includes energizing means for energizing said energizing coil by a power including an AC component, adding means for adding said output signals to each other, and control means for generating a difference signal by comparing an added value of said output signals with the reference value, and controlling an energizing current flowing through said energizing coil so that said difference signal will become zero.

19. The magnetic position sensor according to claim 17, wherein said position signal generating means generates said position signal according to either one of said output signals or the difference of said output signals.

* * * * *